United States Patent
Nishihara (12)

(10) Patent No.: US 6,424,620 B1
(45) Date of Patent: Jul. 23, 2002

(54) CONGESTION CONTROL SYSTEM CAPABLE OF DETECTING CONGESTION OCCURRING IN AN ASYNCHRONOUS TRANSFER MODE NETWORK AND AUTONOMOUSLY AVOIDING THE CONGESTION

(75) Inventor: Motoo Nishihara, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/157,471

(22) Filed: Sep. 21, 1998

(30) Foreign Application Priority Data

Dec. 8, 1997 (JP) ............................................. 9-351997

(51) Int. Cl.⁷ .......................................... H04L 12/433
(52) U.S. Cl. ....................... 370/229; 370/232; 370/235; 370/395; 370/400
(58) Field of Search ................................ 370/229, 230, 370/231, 232, 233, 234, 235, 242, 395, 397, 522, 400, 409, 410, 419, 420, 463, 252, 253, 230.1

(56) References Cited

U.S. PATENT DOCUMENTS

| | | | | |
|---|---|---|---|---|
| 5,251,209 A | * | 10/1993 | Jurkevich et al. | 370/468 |
| 5,400,329 A | * | 3/1995 | Tokura et al. | 370/232 |
| 5,745,697 A | * | 4/1998 | Charny et al. | 709/233 |
| 5,898,669 A | * | 4/1999 | Shimony et al. | 370/232 |
| 5,991,268 A | * | 11/1999 | Awdeh et al. | 370/232 |
| 6,005,843 A | * | 12/1999 | Kamiya | 370/231 |
| 6,072,775 A | * | 6/2000 | Ikeda | 370/236 |
| 6,108,302 A | * | 8/2000 | Murase | 370/230 |
| 6,122,252 A | * | 9/2000 | Aimoto et al. | 370/235 |
| 6,188,671 B1 | * | 2/2001 | Chase et al. | 370/232 |
| 6,226,265 B1 | * | 5/2001 | Nakamichi et al. | 370/235 |

FOREIGN PATENT DOCUMENTS

| | | |
|---|---|---|
| JP | Sho 63-193640 | 8/1988 |
| JP | Hei 5-153155 | 6/1993 |
| JP | Hei 7-221770 | 8/1995 |
| JP | Hei 7-508378 | 9/1995 |
| JP | Hei 8-18569 | 1/1996 |
| JP | 8-204721 | 8/1996 |
| JP | 9-149046 | 6/1997 |

OTHER PUBLICATIONS

English language translation of Japanese Office Action dated Mar. 9, 1999 (Hei 11).

"A New Scheme of Connectionless Transmission over ATM", Ogawa et al., Communication Technology Report SSE97–36, Jun. 23, 1997, pp. 97–102.

"Standarization Aspects of Congestion Control Schemes for Best Effort Class in ATM Networks", Ikeda et al, Communication Technology Report IN94–41, May 13, 1994, pp. 15–20.

"Congestion avoided method using route switching in ATM networks", Tatsuo et al. 1993 fall Communication Technology Conference B–657, Sep. 1993, p. 3–296.

* cited by examiner

*Primary Examiner*—Ajit Patel
*Assistant Examiner*—Saba Tsegaye
(74) *Attorney, Agent, or Firm*—Whitham, Curtis & Christofferson, P.C.

(57) ABSTRACT

A congestion control system comprises an average flowing speed measuring unit for measuring average flowing speed of a transfer packet, a congestion detecting unit for detecting congestion caused by outside blocking based on the average flowing speed, a permissible flowing speed calculating unit for calculating permissible flowing speed of a transfer packet, a flowing speed control unit for controlling the average flowing speed of an entering packet under the permissible flowing speed when detecting congestion, an inside node congestion detecting unit for detecting inside node congestion, a congestion detecting unit for detecting congestion caused by inside blocking from the detection result of the inside node congestion and the congestion caused by the outside blocking, a transfer channel database for storing transfer channel information indicating transfer channels, a transfer channel retrieval unit for retrieving a transfer channel possible to avoid a relay node having the inside node congestion detected when detecting the congestion caused by the inside blocking.

5 Claims, 13 Drawing Sheets

FIG. 11

106 CHANNEL DATABASE

| 111 SOURCE EDGE ADDRESS | 112 DESTINATION EDGE ADDRESS | 113 CHANNEL CANDIDATE NUMBER | TUNNELING ADDRESS | | | |
|---|---|---|---|---|---|---|
| | | | 1st | 2nd | --- | Last |
| a | b | default | c | d | --- | |
| c | d | "2" | | | --- | f |
| | | default | | | --- | |
| --- | --- | --- | --- | --- | --- | --- |

114-1     114-2     114-N

CONGESTION CONTROL SYSTEM CAPABLE OF DETECTING CONGESTION OCCURRING IN AN ASYNCHRONOUS TRANSFER MODE NETWORK AND AUTONOMOUSLY AVOIDING THE CONGESTION

BACKGROUNDS OF THE INVENTION

1. Field of the Invention

The present invention relates to a congestion control system, and more particularly to a congestion control system capable of detecting congestion occurring in an Asynchronous Transfer Mode (ATM) network for transferring connectionless traffic and autonomously avoiding the congestion.

2. Description of the Related Art

Recently, attention is being given to an ATM communication as a high-speed communication technique or a scalable wide-band transfer technique making good use of resources such as terminals introduce by a user on the basis of the communication technique of the existing LAN (Local Area Network) such as Ethernet. In this ATM communication, cell for dividing the transfer data with the transfer control information including the destination information attached thereto by the fixed length is defined as the unit of transfer and these cells are transferred to a network of the destination while passing on the respective ATM switches.

However, if using this ATM communication heavily in the field of the information communication, disadvantages such as abandonment of transfer data may occur due to the congestion caused by an increase of transfer information amount and overload on a node, thereby increasing the importance of technology for relieving the congestion.

In order to relieve the congestion, there is known a congestion control system for controlling traffic on a corresponding connection depending on the congestion state notified by the ATM network, at the entrance of receiving transfer packets for a network such as the ATM network. In this system, a virtual communication channel which is inevitably decided from a plurality of Virtual Path Identifiers (VPI) and Virtual Channel Identifiers (VCI) established on the identical transfer channel is defined as a connection group.

Since the ATM communication can establish a virtual communication channel inevitably decided from a plurality of VPIs and VCIs, within a physical line or a virtual path, it can make efficient use of the resources while restraining the cell abandonment at the minimum on a connection having the congestion occurrence.

FIG. 14 is a view for use in describing the principle of the conventional congestion control system. In this congestion control system, the respective transfer packets are transferred from a plurality of connections 201a, 201b, and 201c via a connection group 202 to a network 203. Connection monitoring means 204a, 204b, and 204c are adopted to monitor the transfer packets flowing from the respective connections 201a, 201b and 201c to the connection group 202 and the flow amount of the transfer packets. A connection group monitoring means 205 is adopted to monitor the transfer packets transferred to the connection group 202 and monitor the flow amount of the transfer packets in every connection group defined by a connection group defining means 206.

The control means 207 can switch the control between monitor mode and control mode, so to control the connection monitoring means 204a, 204b, and 204c and the connection group monitoring means 205. The monitor mode is an operation mode for monitoring whether the flow amount of a transfer packet is beyond a predetermined threshold or not. The control mode is an operation mode for abandoning the extra packets when the flow amount of the transfer packets is beyond the threshold, and controlling the priority of abandonment by the cell loss priority (CLP) display.

In the non-congestion state, the connection monitoring means 204a, 204b, and 204c are operated in a monitor mode and the connection group monitoring means 205 is operated in a control mode. Namely, packets to be transferred from the connection group 202 to the network 203 are controlled and their flow amount is controlled by every connection group, so as not to cause the congestion within the network 203.

In the congestion state, a connection on which the packet flow amount is beyond the threshold is recognized, based on the monitoring result from the connection monitoring means 204a, 204b, and 204c monitoring the flow amount of the respective packets of the respective connections 201a, 201b, and 201c. One of the connection monitoring means 204a, 204b, and 204c corresponding to the connection is switched to a control mode. In the other words, the packet flow amount is controlled only on a congested connection.

A congestion control technique for performing the flow control of traffic called polishing at the entrance of a network of the above-mentioned congestion control system is disclosed in, for example, Japanese Patent Publication Laid-Open (Kokai) No. Heisei 9-149046, "Packet Flow Amount Monitoring/Controlling Method".

Further, a technique for performing the dynamic control of traffic within ATM switches dispersedly arranged in a network, instead of the flow control of the traffic at the entrance of a network, is disclosed in, for example, Japanese Patent Publication Laid-Open (Kokai) No. Heisei 8-204721, "Congestion Control Method in Asynchronous Transfer Mode Network".

The conventional congestion control system is only to relieve congestion by monitoring the transfer flow only at the entrance of a network or within an ATM switch. It is not to make good use of resources of the whole network.

Namely, the technique disclosed in Japanese Patent Publication Laid-Open (Kokai) No. Heisei 9-149046, in which the flow control of traffic is performed at the entrance of a network, has to define every expected traffic as a connection group. Therefore, it is difficult to apply this technique to the traffic having the difficulty of defining the quality and having the dynamically changing volume like connectionless traffic. Even if applying this technique to such traffic, complicated processing will be required in order to assign the network resources efficiently.

The technique disclosed in Japanese Patent Publication Laid-Open (Kokai) No. Heisei 8-204721, in which the dynamic control of traffic is performed only within an ATM switch, requires complicated processing for the optimal control of the add-on device and ATM switches dispersedly arranged according to the transfer situation therebetween, in order to monitor traffic on the whole network and control congestion. It is difficult to apply the technique to the whole network.

The ATM forum recommends ABR (Available Bit Rate) regulation in an ATM network as a technique for dynamically assigning the resources of a network on a predetermined fixed channel to the respective traffic. This ABR regulation, however, requires the traffic control between terminals by the flow unit, thereby needing building a complicated network system and an edge device. Further, since the regulation includes neither a method of dynamically changing a channel nor condition of changing a channel, it cannot make use of the network resources dynamically and efficiently, or even if making use of the resources, complicated and sophisticated processing will be required.

SUMMARY OF THE INVENTION

A first object of the present invention is to provide a congestion control system capable of detecting congestion occurring in an ATM network, with respect to connectionless traffic, in a simple structure, so to relieve the congestion, thereby making use of the network resources efficiently.

A second object of the present invention is to provide a congestion control system capable of detecting congestion caused by outside blocking occurring on the boundaries of a user network and an ATM network for transferring connectionless data, with an easy operation, and further capable of autonomously relieving congestion caused by the outside blocking, in a simple structure.

A third object of the present invention is to provide a congestion control system capable of detecting congestion caused by inside blocking as second congestion when no congestion caused by the outside blocking is detected as the first congestion and autonomously relieving the congestion caused by the inside blocking.

A fourth object of the present invention is to provide a congestion control system capable of autonomously relieving congestion caused by outside blocking, in a simple structure free from complicated and enormous network equipment.

A fifth object of the present invention is to provide a congestion control system capable of autonomously relieving congestion caused by inside blocking as the second congestion, which cannot be relieved only by the change of a transfer channel.

A sixth object of the present invention is to provide a congestion control system capable of changing a transfer channel easily and flexibly by use of loose source routing in order to relieve congestion caused by inside blocking, without changing setting of a relay node within an ATM network, and capable of simplifying the structure of a relay node.

According to one aspect of the invention, a congestion control system for detecting and relieving congestion occurring in a network system including an ATM network, a source user network for sending a transfer packet in asynchronous transfer mode, and a destination user network for receiving the transfer packet from the source user network, the congestion control system comprises average flowing speed measuring means for measuring average flowing speed of a transfer packet flowing from the source user network, for every destination user network, first congestion detecting means for detecting first congestion occurring when the total sum of the average flowing speed of every source user network is greater than the transfer speed toward the destination user network, permissible flowing speed calculating means for calculating permissible flowing speed of a transfer packet flowing from the source user network, based on the total sum of the average flowing speed and the transfer speed and establishing the permissible flowing speed, and flowing speed control means for controlling the average flowing speed of a packet flowing from the source user network under the permissible flowing speed when detecting first congestion by the first congestion detecting means.

In the preferred construction, the measured average flowing speed is notified to the first congestion detecting means and the permissible flowing speed calculating means by a first congestion controlling packet for controlling congestion, and the first congestion detected by the first congestion detecting means is notified to the flowing speed control means by a second congestion controlling packet which is returned in reply to the first congestion controlling packet.

In another preferred construction, the average flowing speed measuring means and the flowing speed control means are mounted on a source edge device provided in every source user network, on the boundaries of the ATM network and the source user network, and the permissible flowing speed calculating means and the first congestion detecting means are mounted on a destination edge device provided in every destination user network, on the boundaries of the ATM network and the destination user network.

In another preferred construction, the average flowing speed measuring means and the flowing speed control means are mounted on a source edge device provided in every source user network, on the boundaries of the ATM network and the source user network, the permissible flowing speed calculating means and the first congestion detecting means are mounted on a destination edge device provided in every destination user network, on the boundaries of the ATM network and the destination user network, the source edge device writes the measured average flowing speed into the first congestion controlling packet for controlling congestion and notifies the packet to the destination edge device, and the destination edge device writes the first congestion detected by the first congestion detecting means into the second congestion controlling packet to be returned in reply to the first congestion controlling packet and notifies the packet to the source edge device In another preferred construction, the permissible flowing speed of every transfer packet flowing from a plurality of the source user networks is set at the same speed.

According to another aspect of the invention, a congestion control system for detecting and relieving congestion occurring in a network system including an ATM network, a source user network for sending a transfer packet in asynchronous transfer mode, a destination user network for receiving the transfer packet from the source user network, and relay nodes relaying a transfer packet to be transferred between the source user network and the destination user network, the congestion control system comprises average flowing speed measuring means for measuring average flowing speed of a transfer packet flowing from the source user network, for every destination user network, first congestion detecting means for detecting first congestion occurring when the total sum of the average flowing speed of every source is greater than the transfer speed toward the destination user network, permissible flowing speed calculating means for calculating permissible flowing speed of a transfer packet flowing from the source user network, based on the total sum of the average flowing speed and the transfer speed, flowing speed control means for controlling the average flowing speed of a packet flowing from the source user network under the permissible flowing speed when detecting first congestion by the first congestion detecting means, inside node congestion detecting means for detecting inside node congestion occurring when the transfer speed of a packet received at the receiving side of the relay node is greater than the transfer speed at the sending side of the relay node, second congestion detecting means for detecting second congestion occurring when the inside node congestion detecting means detects the inside node congestion and the first congestion detecting means detects none of the first congestion, transfer channel database for storing transfer channel information indicating transfer channels corresponding to the transfer from the source user network to the destination user network, transfer channel retrieving means for retrieving a transfer channel possible to avoid a relay node having the inside node congestion detected by the inside node congestion detecting means, from the transfer channel database, when detecting the second congestion by the second congestion detecting means, and transfer channel control means for controlling the transfer based on a transfer channel retrieved by the transfer channel retrieving means.

In the preferred construction, the measured average flowing speed is notified to the first congestion detecting means and the permissible flowing speed calculating means by a first congestion controlling packet for controlling congestion, and the first congestion detected by the first congestion detecting means and the detection result by the inside node congestion detecting means are notified to the flowing speed control means, the second congestion detecting means, and the transfer channel retrieving means by a second congestion controlling packet which is returned in reply to the first congestion controlling packet.

In another preferred construction, the average flowing speed measuring means, the flowing speed control means, the second congestion detecting means, and the transfer channel control means are mounted on a source edge device provided in every source user network, on the boundaries of the ATM network and the source user network, the permissible flowing speed calculating means and the first congestion detecting means are mounted on a destination edge device provided in every destination user network, on the boundaries of the ATM network and the destination user network, and the transfer channel database and the transfer channel retrieving means are provided in a network monitor for monitoring the congestion state within the ATM network.

In another preferred construction, the average flowing speed measuring means, the flowing speed control means, the second congestion detecting means, and the transfer channel control means are mounted on a source edge device provided in every source user network, on the boundaries of the ATM network and the source user network, the permissible flowing speed calculating means and the first congestion detecting means are mounted on a destination edge device provided in every destination user network, on the boundaries of the ATM network and the destination user network, the transfer channel database and the transfer channel retrieving means are provided in a network monitor for monitoring the congestion state within the ATM network, the source edge device includes notifying means for writing the measured average flowing speed into the first congestion controlling packet for controlling congestion and notifying the packet to the destination edge device via the relay node having the inside node congestion detecting means, and the destination edge device includes notifying means for writing the first congestion detected by the first congestion detecting means and the detection result by the inside node congestion detecting means into the second congestion controlling packet to be returned in reply to the first congestion controlling packet and notifying the packet to the source edge device and the network monitor.

In another preferred construction, the relay node includes notifying means for writing the detection result of the inside node congestion by the inside node congestion detecting means into the first congestion controlling packet and notifying the packet to the destination edge device.

In another preferred construction, the congestion control system further comprises resource changing means for changing resources assigned for the transfer from the source user network to the destination user network, and resource change requesting means for requesting the resource changing means to change the resource assignment when the second congestion detected by the second congestion detecting means is not relieved by the transfer channel control means changing a transfer channel by the transfer channel control means.

In another preferred construction, the permissible flowing speed of every transfer packet flowing from a plurality of the source user networks is set at the same speed.

In another preferred construction, the transfer channel control means changes a transfer channel according to loose source routing so as to control the transfer.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 11 is a view for use in describing the storing content of a channel database of the network monitor according to the embodiment;

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
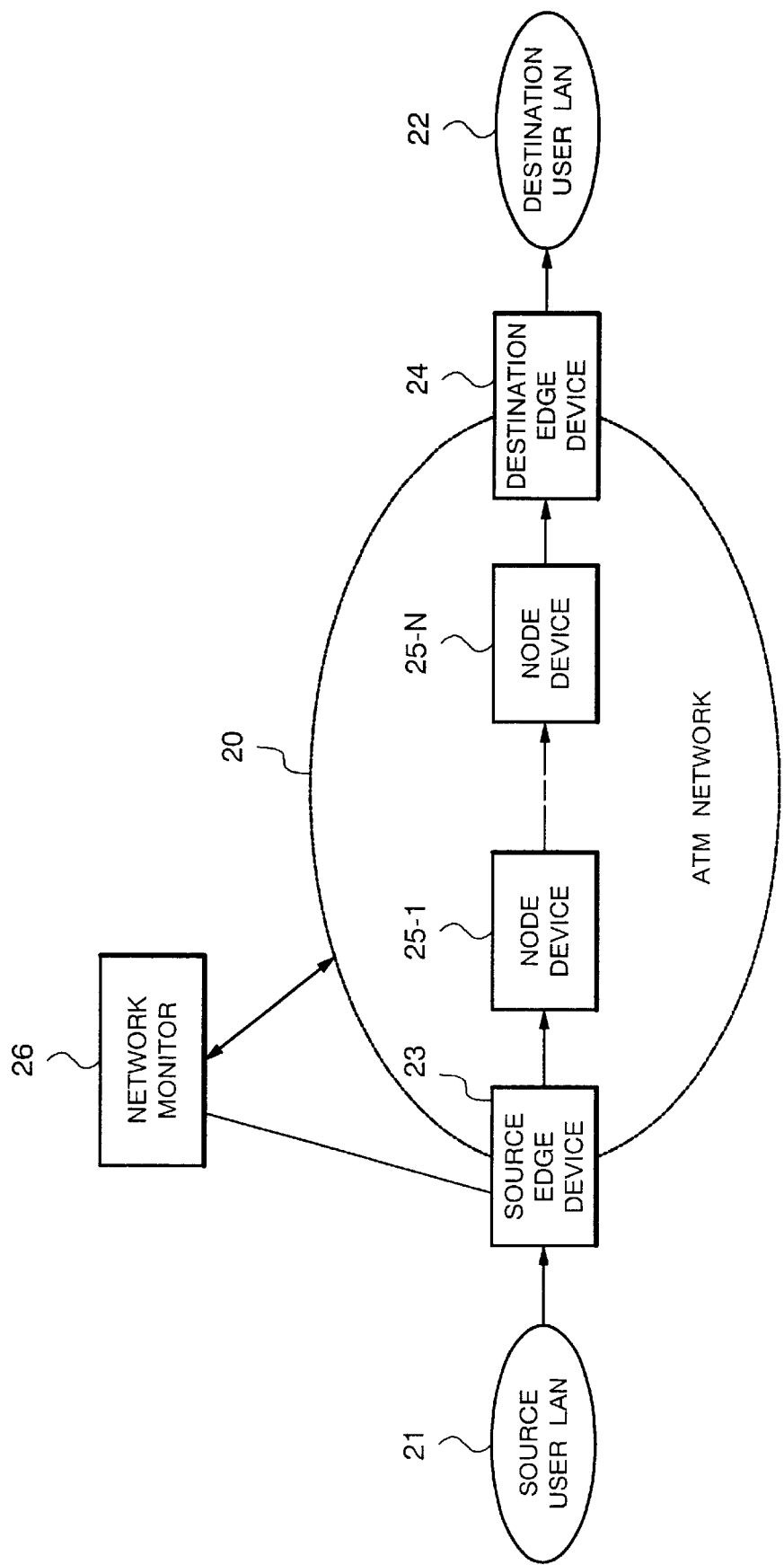
FIG. 1 is a system structural view showing the outline of the structure of a congestion control system according to an embodiment of the present invention.

FIG. 1 shows the outline of the structure of a congestion control system according to an embodiment of the present invention. This congestion control system consists of networks including an ATM network 20, a source user LAN (Local Area Network) 21 sending a transfer packet in asynchronous transfer mode, and a destination user LAN 22 that is the destination of the transfer packet to be transferred to from the source user LAN 21.

A source edge device 23 is provided on the boundaries of the ATM network 20 and the source user LAN 21, while a destination edge device 24 is provided on the boundaries of the ATM network 20 and the destination user LAN 22. Node devices 25-1, . . . , 25-N are dispersedly disposed within the ATM network 20, so as to relay the transfer packet between the source edge device 23 and the destination edge device 24.

These edge devices 23 and 24 and the node devices 25-1, . . . , 25-N are connected together via a semi-permanent VP (Virtual Path) in the ATM network 20, a network for connectionless data transfer can be overlaid on a public ATM network. Namely, the public ATM network is designed to be able to supply some of the VP link resources to a network for connectionless data transfer.

The respective edge devices 23 and 24 terminate the respective LAN interfaces on the side of the user LANs such as the source user LAN 21 and the destination user LAN 22 and terminate the ATM interfaces on the side of the ATM network 20.

The congestion control system has a network monitor 26 for monitoring the congestion state within the ATM network 20. The network monitor 26 is connected to the source edge device 23, so as to monitor the ATM network 20, notify the congestion state, and notify a transfer channel in the event of congestion.

Connectionless addresses defined only within the ATM network 20 are provided in the respective edge devices 23 and 24 and the respective node devices 25-1 to 25-N of this congestion control system. A source edge address is given to the source edge device 23, a destination edge address is given to the destination edge device 24, and node addresses are respectively given to the node devices 25-1 to 25-N.

The node devices 25-1 to 25-N are respectively provided with routing tables, where semi-fixed transfer channels are defined. When a user packet generated from the source user LAN 21 flow into the ATM network 20 via the source edge device 23, the respective node devices 25-1 to 25-N refer to the respective routing tables according to the destination edge address included in the received user packet. Based on the routing table, the next transfer destination is decided and the user packet reaches the destination edge device 24 via some node devices. The user packet arrived at the destination edge device 24 is delivered to the destination user LAN 22 that is the destination of the user packet.

In order to make easy the understanding of the above congestion control system, the principle of specifying congestion to be detected by this system so as to avoid the congestion will be described at first, and thereafter the respective components of the congestion control system will be described.

The congestion control system is characterized in that congestion occurrence at the transfer of connectionless traffic on the ATM network 20 is detected, so to avoid this congestion. Congestion to be detected by the congestion control system will be described at first.

In the congestion control system, there are two types of congestion to be detected; outside blocking and inside blocking. The outside blocking occurs when the traffic from the ATM network 20 to the destination edge device 24 is greater than the possible transfer speed from the destination edge device 24 to the destination user LAN 22.

Figure 2:
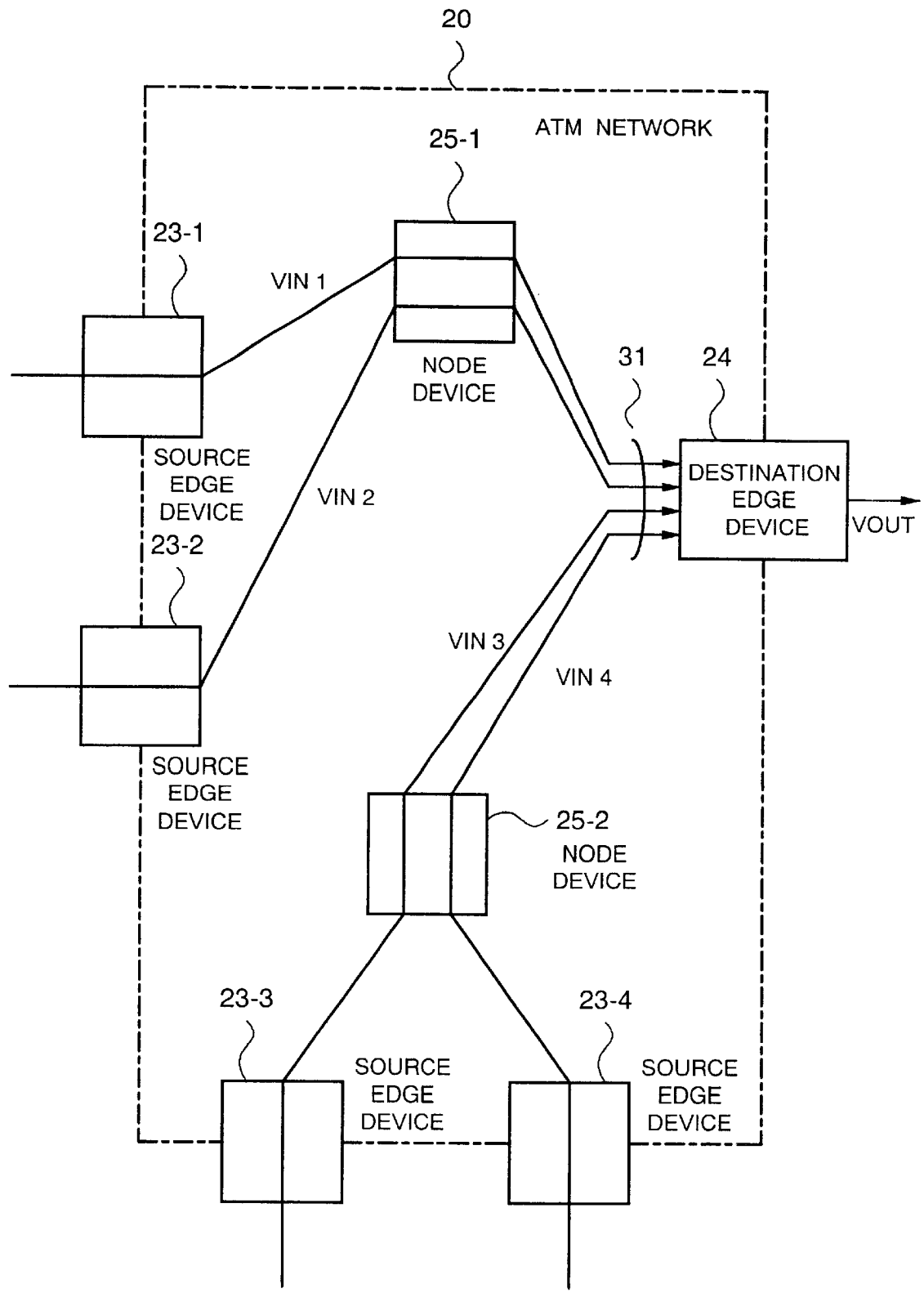
FIG. 2 is a view for use in describing the principle of congestion occurrence by outside blocking.

FIG. 2 is a view for use in describing the principle of congestion occurrence by the outside blocking. To make the explanation of the outside blocking brief, assume that the source edge devices 23-1, . . . , 23-4, the destination edge device 24, and the node devices 25-1 and 25-2 are disposed on the boundary of a user network on the ATM network 20.

Assume that user packets are sent from source user LANs 21 to be accommodated in the respective source edge devices 23-1, . . . , 23-4, to the destination user LAN 22 to be accommodated in the destination edge device 24. Here, the traffic speed from the source edge device 23-1 toward the destination edge device 24 via the node device 25-1 is defined as VIN 1, the traffic speed from the source edge device 23-2 via the node device 25-1 is defined as VIN 2, the traffic speed from the source edge device 23-3 via the node device 25-2 is defined as VIN 3, and the traffic speed from the source edge device 23-4 via the node device 25-2 is defined as VIN 4. The possible transfer LAN speed from the destination edge device 24 to the destination user LAN 22 is represented as VOUT.

Since the total sum 31 of the traffic flowing into the destination edge device 24 from the ATM network 20 is the total sum of VIN 1 to VIN 4, the condition of the outside blocking occurrence can be expressed by the following formula (1).

$$\sum_i VINi > VOUT \quad (i = 1, 2, 3, 4) \qquad (1)$$

While, the inside blocking means the congestion occurring within the ATM network under the condition of no occurrence of the outside blocking.

Figure 3:
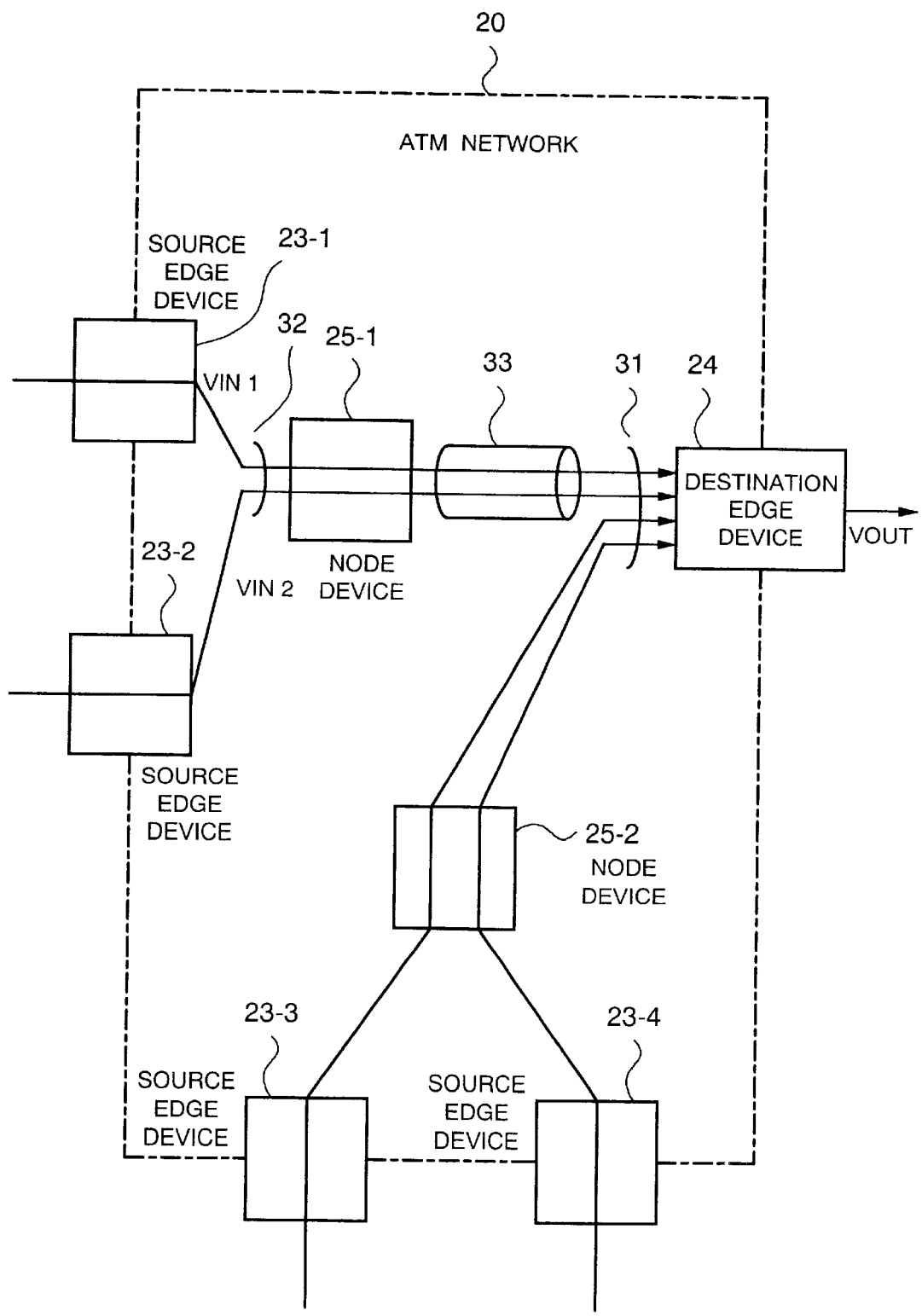
FIG. 3 is a view for use in describing the principle of congestion occurrence by inside blocking.

FIG. 3 is a view for use in describing the principle of congestion occurrence by the inside blocking. The same reference numerals are attached to the same components as the explanation view of the outside blocking occurrence shown in FIG. 2, so to omit their description.

Notice should be taken to the node device 25-1 on a transfer channel of a user packet. The inside blocking meaning the congestion occurring within the ATM network under the condition of no occurrence of the outside blocking, the inside blocking occurs on the node device 25-1 in the following two cases, where the possible speed 33 from the node device 25-1 is expressed by Vlink.

a) The total sum 32 of the traffic flowing into the node device 25-1 is greater than the possible speed Vlink from the node device 25-1.

b) The total sum 31 of the traffic flowing into the destination edge device 24 from the ATM network 20 is smaller than the possible LAN speed VOUT to transfer from the destination edge device 24 to the destination user LAN.

Specifically, the condition of the inside blocking occurrence can be expressed by the following formulas (2) and (3).

$$\sum_j VINj > Vlink \quad (j = 1, 2) \tag{2}$$

$$\sum_i VINi < VOUT \quad (i = 1, 2, 3, 4) \tag{3}$$

In order to detect and relieve this congestion, in the congestion control system, an RM (Resource Management) packet and a BRM (Backward Resource Management) packet are defined as a congestion management packet, within the network, differently from a user packet.

An RM packet is to be transferred periodically from each source edge device 23 to a destination edge device 24. While, a BRM packet is to be returned to the source edge device 23 as a reply packet of the RM packet, from the destination edge device 24. The RM packet and the BRM packet are transferred being relayed by the respective node devices 25-1, . . . , 25-N according to the destination information, in the same way as a user packet.

The source edge device 23 measures the average flowing speed of traffic flowing into the ATM network 20 from the source user LAN 21 for every destination edge device 24 of the traffic, which is written down in the RM packet. The destination edge device 24 monitors the average flowing speed written in the RM packet sent from each source edge device.

The outside blocking having been described so far can be detected by the destination edge device in a way of notifying the average flowing speed measured by the source edge device 23 by the RM packet. Namely, the destination edge device 24 detects the outside blocking from the average flowing speed notified by the RM packet, according to the formula (1). A notice of the outside blocking occurrence and the permissible average flowing speed of the destination edge device are notified to the source edge device 23 by the BRM packet. The congestion caused by the outside blocking can be cut by controlling the average flowing speed in the source edge device 23 according to the notice.

While, the inside blocking can be detected by the source edge device 23. The congestion shown by the formula (2) is detected by the respective node devices 25-1, . . . , 25-N, notified as the congestion information with the RM packet, and returned from the destination edge device 24 with the BRM packet. The source edge device 23 can detect a notice of the outside blocking occurrence and the inside blocking occurrence by the congestion information of the respective node devices 25-1, . . . , 25-N, according to the BRM packet, in the above-mentioned formula (3). The inside blocking depending on the using condition of the resources on the whole network, the congestion caused by the inside blocking can be cut by notifying the network device 26 of a changing request of a transfer channel and assignment of the network resources.

Figure 4:
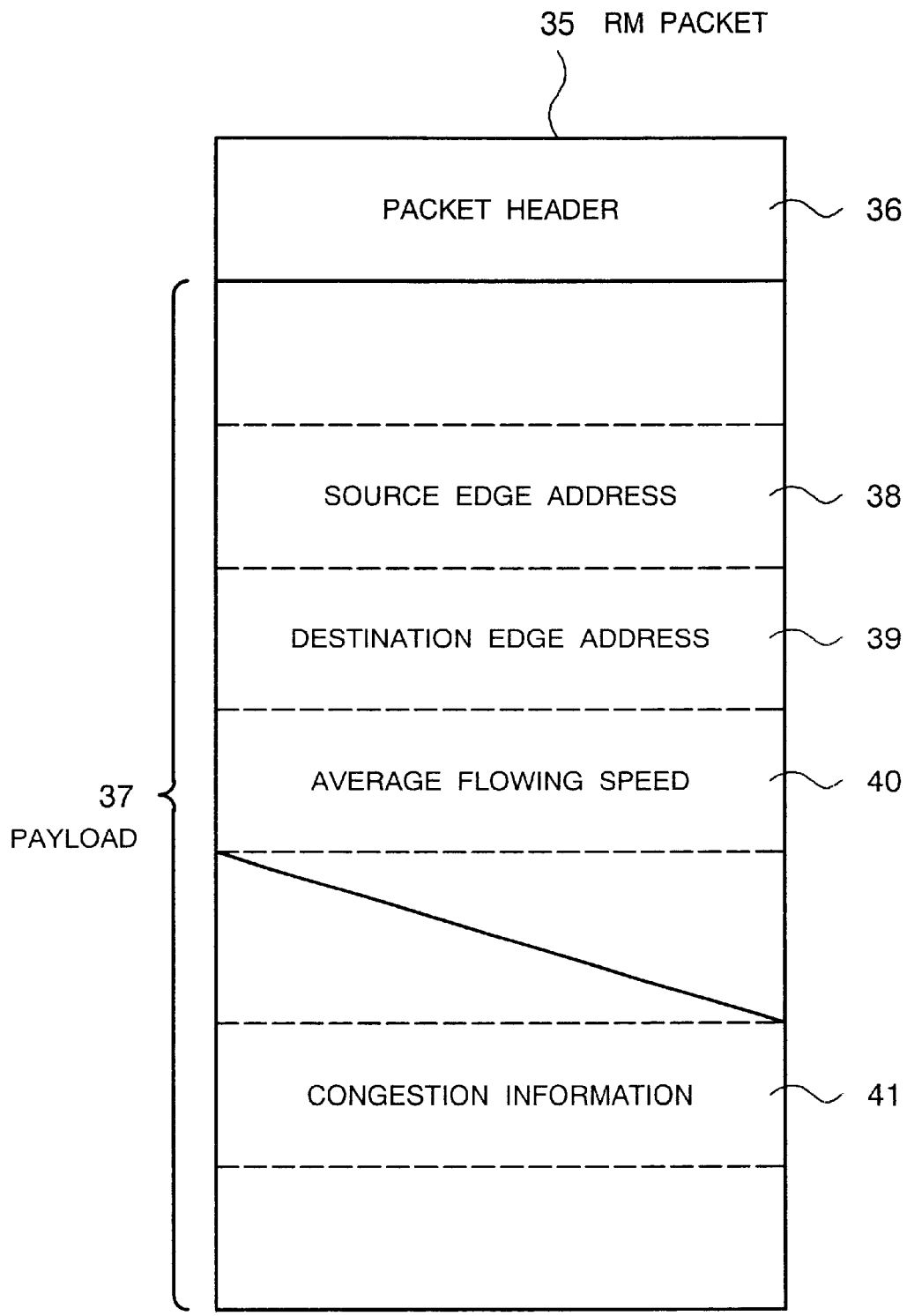
FIG. 4 is a format structural view of an RM packet according to the embodiment.

FIG. 4 shows the format structure of an RM packet. The RM packet 35 consists of a packet header 36 and a payload 37 in the same way as the conventional ATM packet.

The payload 37 of the RM packet 35 consists of a source edge address field 38 for entering a source edge address for identifying a source edge device 23, a destination edge address field 39 for entering a destination edge address for identifying a destination edge device 24, an average flowing speed field 40 for entering the average flowing speed of traffic flowing into the ATM network 20, which has been measured by the source edge device 23, and a congestion information field 41 for entering the presence of congestion within the node devices 25-1 to 25-N, a node address for identifying each node device 25-1, . . . , 25-N, and the congestion level. The source edge device 23 periodically sends this RM packet 35 to the destination edge device 24. Upon receipt of the RM packet 35, the destination edge device 24 returns the BRM packet as the reply packet.

Figure 5:
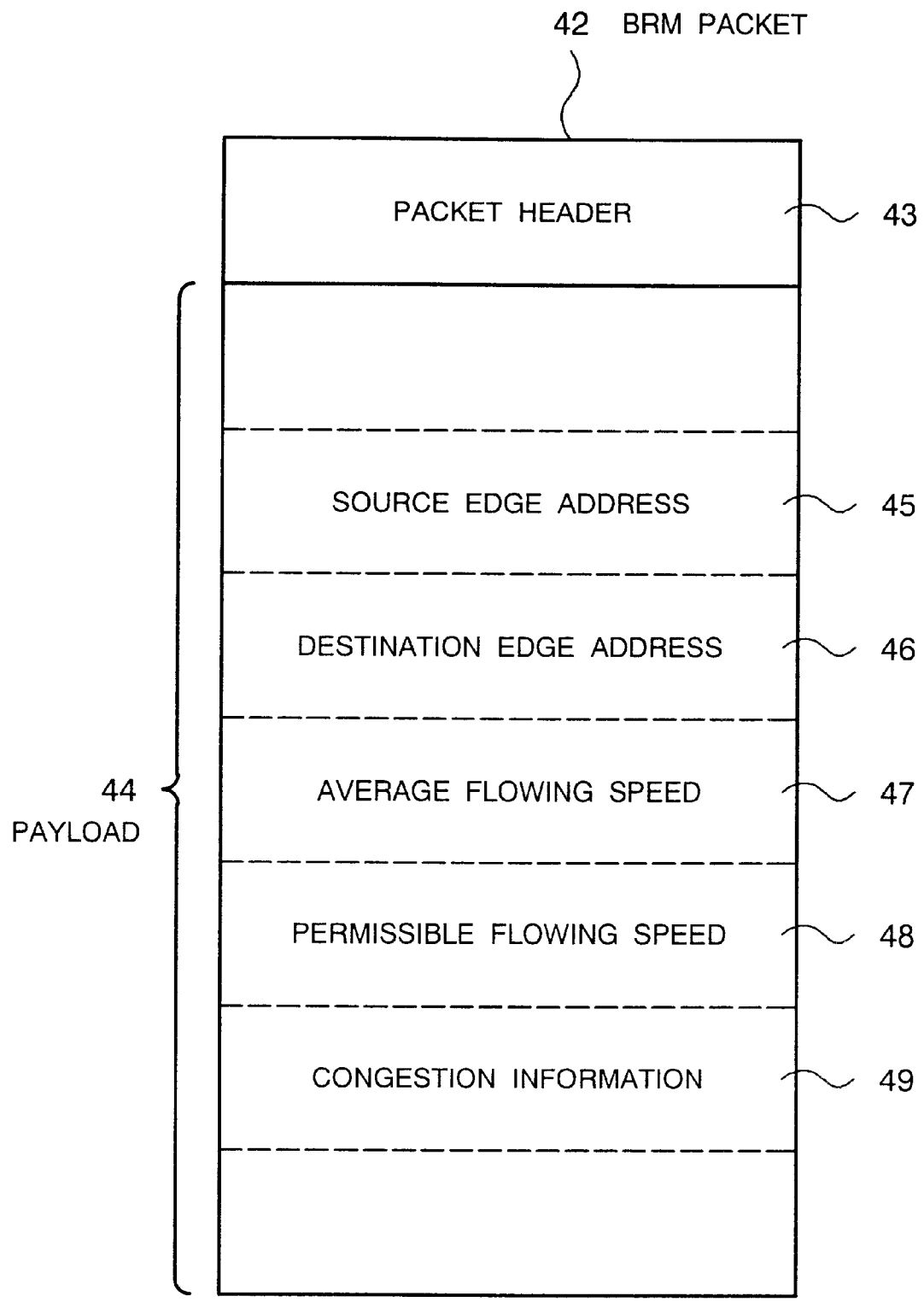
FIG. 5 is a format structural view of a BRM packet according to the embodiment.

FIG. 5 shows the format structure of a BRM packet. The BRM packet 42 consists of a packet header 43 and a payload 44 in the same way as the conventional ATM packet.

The payload 44 of the BRM packet 42 includes a source edge address field 45 for entering a source edge address for identifying a source edge device 23, a destination edge address field 46 for entering a destination edge address for identifying a destination edge device 24, an average flowing speed field 47 for entering the average flowing speed of traffic flowing into the ATM network 20, which has been measured by the source edge device 23, a permissible flowing speed field 48 for entering the presence of outside blocking occurrence and permissible flowing speed that is the permissible average flowing speed-on the source edge device 23 free from outside blocking occurrence, and a congestion information field. 49 for entering congestion information. The congestion information to be entered into the congestion information field 49 includes the presence of congestion occurrence, the node address of a node device 25-1, . . . , or 25-N where the congestion occurred, and the congestion level information.

Each component of the congestion control system for detecting and relieving congestion by use of the RM packet 35 and the BRM packet 42 will be described in detail.

Figure 6:
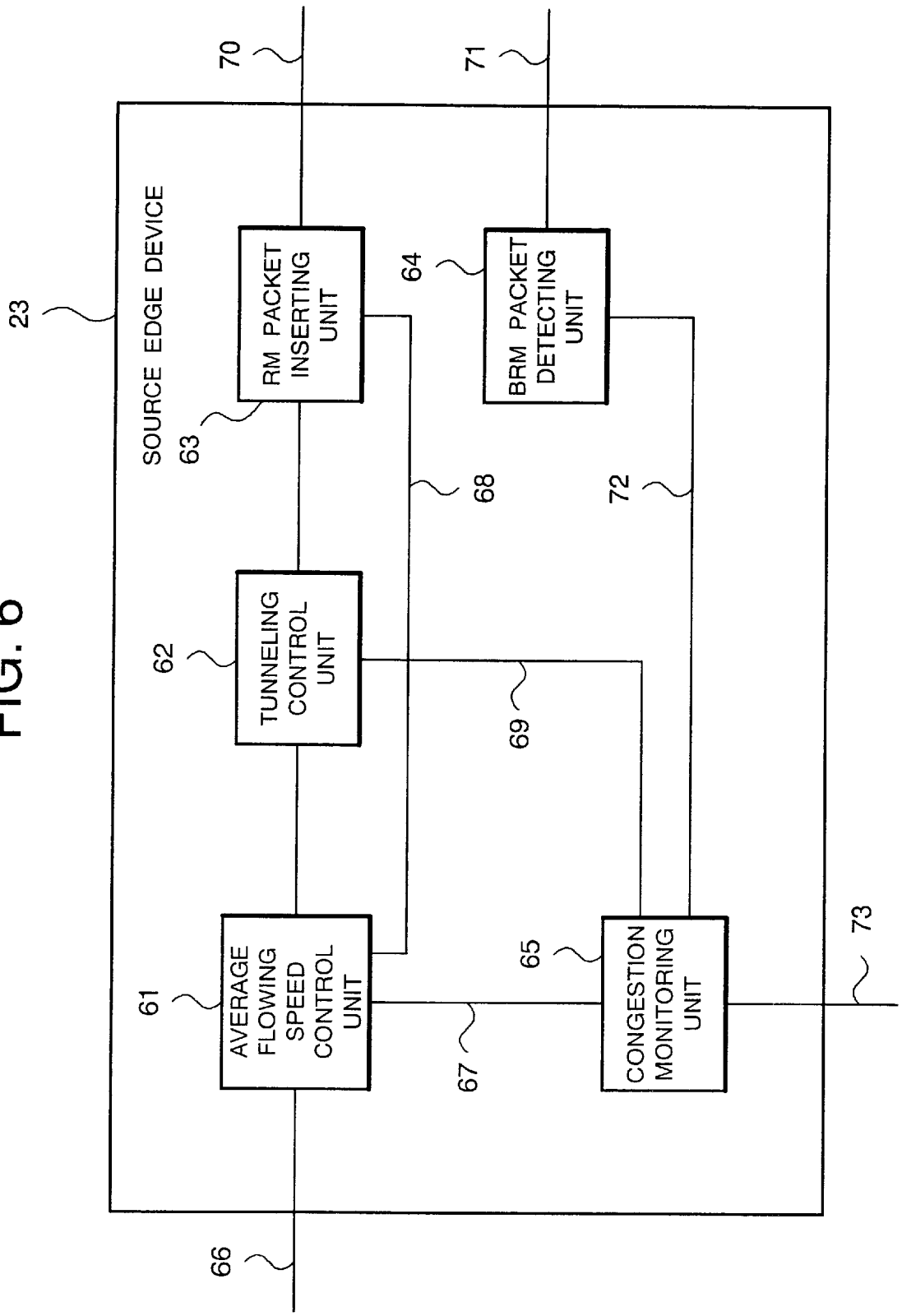
FIG. 6 is a block diagram showing the inside structure of a source edge device according to the embodiment.

FIG. 6 specifically shows the important portion of the structure of the source edge device 23 in the congestion control system shown in FIG. 1. The source edge device 23 comprises an average flowing speed control unit 61, a tunneling control unit 62, an RM packet inserting unit 63, a BRM packet detecting unit 64, and a congestion monitoring unit 65.

The traffic 66 from the source user LAN 21 to the ATM network 20 is entered into the average flowing speed control unit 61 of the source edge device 23. Then, the average flowing speed of the traffic 66 can be regulated so as not to exceed the permissible flowing speed 67 which has been written in the permissible flowing speed field 48 of the BRM packet 42 by the destination edge device 24.

The traffic beyond the permissible flowing speed 67 will be abandoned. In the average flowing speed control unit 61, the average flowing speed of the entering packets is measured for every destination edge address and their measured results 68 are notified to the RM packet inserting unit 63. The traffic on which the average flowing speed has been controlled by the average flowing speed control unit 61 is entered into the tunneling control unit 62.

The tunneling control unit 62, upon receipt of the traffic from the average flowing speed control unit 61, functions only in case of congestion occurrence by the inside blocking. In case of congestion occurrence by the inside blocking, the tunneling control unit 62 performs loose source routing by the packet unit on the traffic passing through a channel having the occurrence of the inside blocking, which is transferred to the RM packet inserting unit 63. According to the loose source routing, a list of the node addresses of the passing node devices is attached to a transfer packet, thereby realizing change of the transfer channel.

The node address list 69 of the node devices to be attached to a transfer packet is notified to the tunneling control unit 62 from the network monitor 26 through the congestion monitoring unit 65. The traffic which does not pass through the channel having the inside blocking is transferred to the RM packet inserting unit 63 without any processing of loose source routing. The details of the loose source routing will be described later.

The RM packet inserting unit 63 enters the average flowing speed 68 measured by the average flowing speed control unit 61 into the average flowing speed field 40 of the RM packet 35 shown in FIG. 4 and periodically inserts the RM packet 35 into every traffic classified by the unit of every destination edge address. The traffic 70 sent from the RM packet inserting unit 63 flows into the ATM network 20 and reaches the destination edge device 22 via the node devices 25-1, . . . , 25-N.

The traffic 71 from the ATM network 20 to the source user LAN 21 is entered into the BRM packet detecting unit 64, where the BRM packet 42 of the traffic 71 is detected, and the information for relieving congestion written in the source address field 45, the destination address field 46, the permissible flowing speed field 48, and the congestion information field 49 of the BRM packet 42 shown in FIG. 5 is notified to the congestion monitoring unit 65 as the congestion detecting information 72. The congestion monitoring unit 65 monitors the congestion detecting information 72 and notifies the average flowing speed control unit 61 of the permissible flowing speed 67 out of the congestion detecting information 72 at the occurrence of the outside blocking.

As mentioned above, the average flowing speed control unit 61 is designed so as to control the traffic flowing from the source user LAN 21 into the ATM network 20 according to the permissible flowing speed 67. When there is a notice of congestion occurrence from a node device on a channel of traffic although there is no outside blocking, the congestion monitoring unit 65 judges that the congestion by the inside blocking occurred by reference to the congestion detecting information 72 and notifies the network monitor 26 of the inside blocking congestion information 73. The inside blocking congestion information 73 includes the source edge address and the destination edge address extracted through the congestion detecting information 72 and the congested node address.

Figure 7:
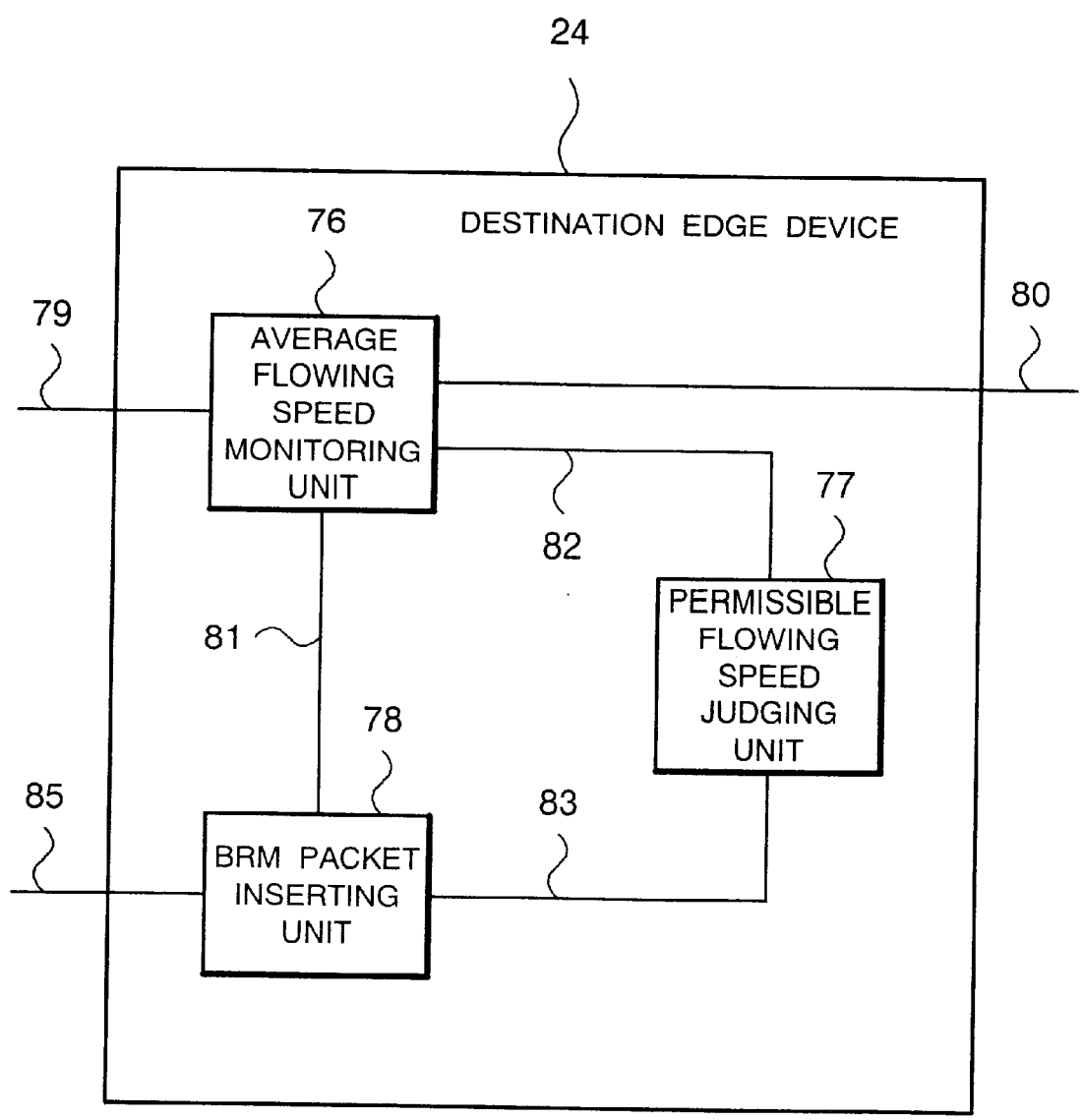
FIG. 7 is a block diagram showing the inside structure of a destination edge device according to the embodiment.

FIG. 7 shows the structure of the destination edge device 24 of the congestion control system shown in FIG. 1 more concretely. The destination edge device 24 includes an average flowing speed monitoring unit 76, a permissible flowing speed judging unit 77, and a BRM packet inserting unit 78.

The traffic 79 flowing from the ATM network 20 into the destination user LAN 22 is entered into the average flowing speed monitoring unit 76 of this destination edge device 24, the RM packet 35 periodically transferred is extracted from the traffic 79, and the other user packet is transferred to the destination user LAN 22 as it is as the traffic 80.

The extracted RM packet 35 is sent to the BRM packet inserting unit 78 as a reply packet 81 of the RM packet 35 and the average flowing speed 82 from the source edge device 23 is notified to the permissible flowing speed judging unit 77 by reference to the average flowing speed field 40 of the RM packet shown in FIG. 4.

The permissible flowing speed judging unit 77 gets the total sum of the average flowing speed 82 notified as mentioned above. When this total sum is larger than the link speed VOUT to be sent to the destination user LAN 22, the unit 77 judges that congestion caused by the outside blocking occurred and decides the permissible average flowing speed for each source edge device 23.

For example, under the condition of transferring traffic from the number M of source edge devices to the destination edge device, it is possible to provide all the number M of the source edge devices with the identical permissible average flowing speed. At this time, the permissible flowing speed judging unit 77 decides the permissible average flowing speed by the expression "permissible average flowing speed=VOUT/M". The permissible flowing speed judging unit 77 notifies the BRM packet inserting unit 78 of the presence of outside blocking and the permissible average flowing speed decided as mentioned above as the congestion notice information 83.

The BRM packet inserting unit 78 changes the reply packet 81 of the RM packet 35 received from the average flowing speed monitoring unit 76 into the BRM packet 42, and the BRM packet 42 is returned to the source edge device 23 after entering the presence of outside blocking and the congestion notice information 83 consisting of the permissible average flowing speed by the permissible flowing speed judging unit 77, into the permissible flowing speed field 48 of the BRM packet 42 shown in FIG. 5.

Figure 8:
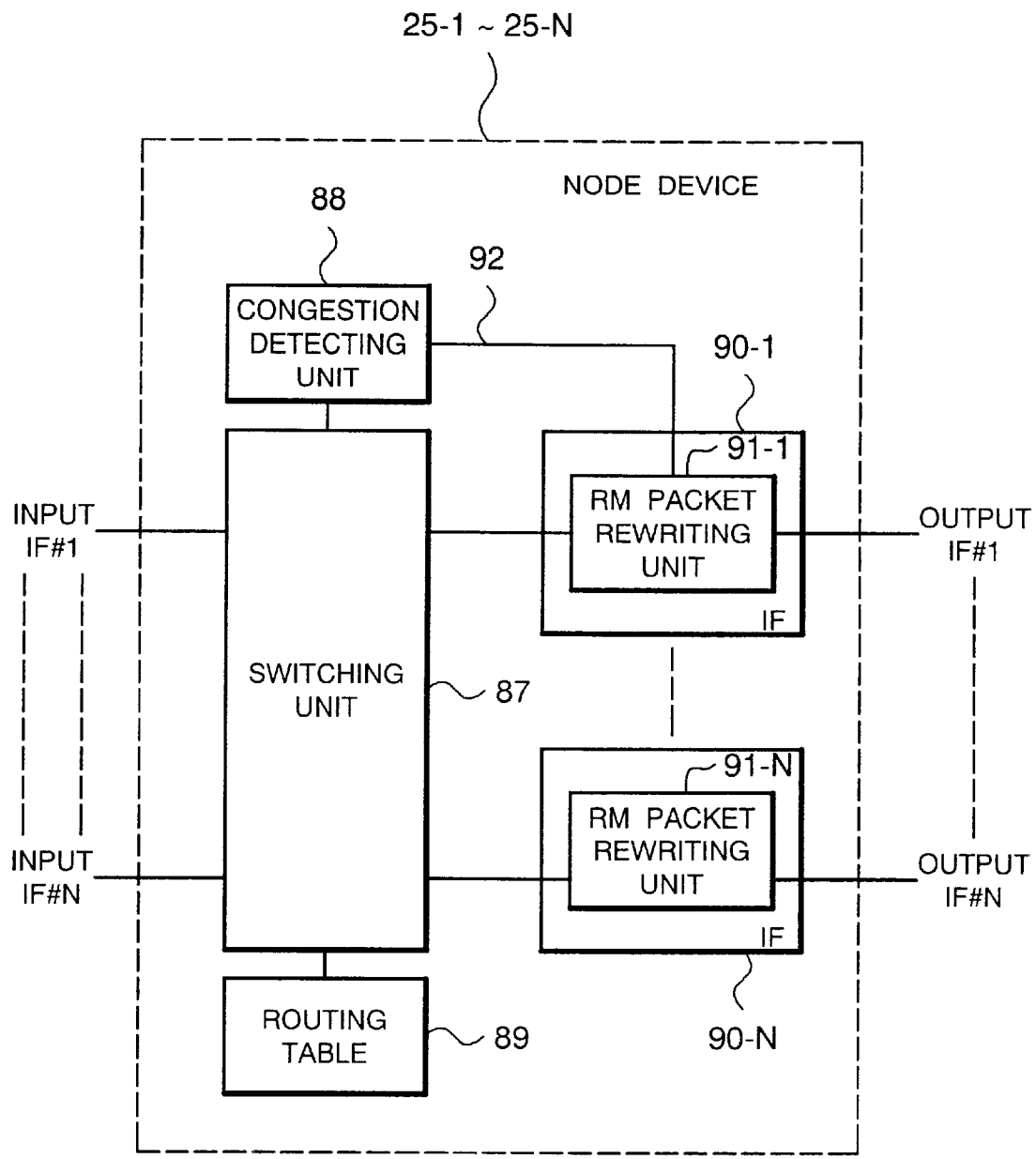
FIG. 8 is a block diagram showing the inside structure of a node device according to the embodiment.

FIG. 8 specifically shows the structure of each node device 25-1, . . . , 25-N of the congestion control system shown in FIG. 1. Each node device 25-1, . . . , 25-N includes a switching unit 87 receiving the number N of input interfaces, a congestion detecting unit 88, a routing table 89, and the number N of interfaces 90-1, . . . , 90-N corresponding to the number N of output interfaces. The interfaces 90-1, . . . , 90-N are respectively provided with the RM packet rewriting units 91-1, . . . , 91-N.

The congestion detecting unit 88 monitors congestion occurring within a node device and notifies the RM packet rewriting unit corresponding to an interface to be affected by the congestion, of the presence of congestion and the node congestion information 92 including the node address of the node device and the congestion level. The RM packet rewriting units 91-1, . . . , 91-N respectively write the node congestion information 92 of their own into the passing RM packets 35.

Deciding a node device or a destination edge device 24 of the next transfer destination according to the routing table 89 judging from the destination edge address attached to a transfer packet entered from the input interface, the switching unit 87 switches a transfer channel so as to deliver the packet from the corresponding output interface.

Figure 9:
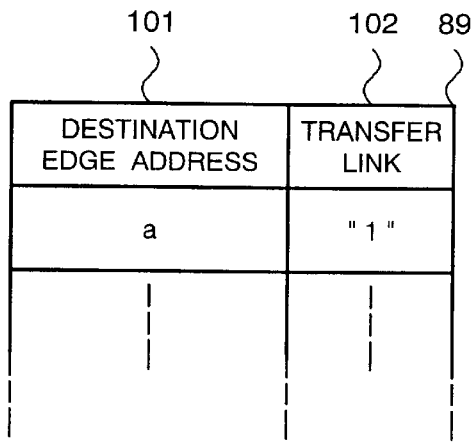
FIG. 9 is a view for use in describing the storing content of a routing table of a node device according to the embodiment.

FIG. 9 shows the structure of the routing table 89 of the node device. The routing table 89 is semi-fixed and designed to store a transfer link 102 corresponding to a destination edge address 101. When a packet flows into a node device, the routing table 89 is referred to. A transfer link corresponding to, for example, the destination edge address "a" attached to the packet is required and the packet is delivered from the output interface corresponding to the transfer link "1" in this case.

Figure 10:
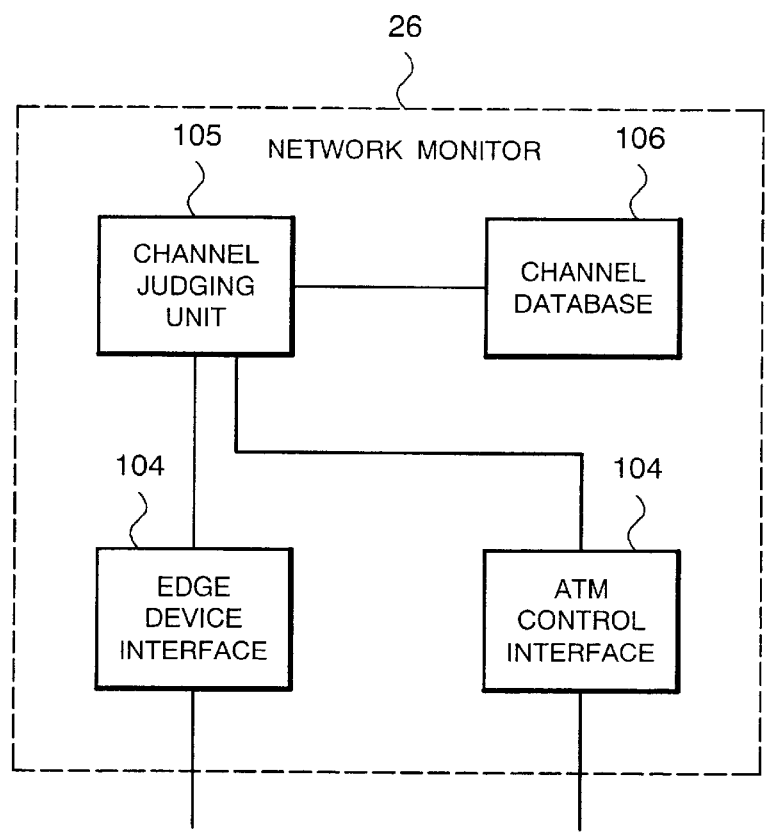
FIG. 10 is a block diagram showing the inside structure of a network monitor according to the embodiment.

FIG. 10 shows the concrete structure of the network monitor 26 of the congestion control system shown in FIG. 1. The network monitor 26 includes an edge device interface 104, a channel judging unit 105, a channel database 106, and an ATM control interface 107.

The edge device interface 104 is an interface connecting the network monitor 26 with the source edge device 23 as illustrated in FIG. 1, for notifying the congestion information and the presence of congestion detected from the source edge device 23. A channel change notice is sent from the network monitor 26 to the tunneling control unit 62 of the source edge device 23.

The channel judging unit 105 specifies the location of congestion from the inside blocking congestion information 73 sent from the source edge device 23 through the edge device interface 104 and changes the transfer channel so as to avoid the location of the congestion.

The channel database 106 is a database including the transfer channel information from a source edge address to a destination edge address, from which the channel judging unit 105 retrieves for changing a channel.

FIG. 11 shows the structure of the channel database 106 of the network monitor. The channel database 106 includes a source edge address 111 for identifying a source edge device 23, a destination edge address 112 for identifying a destination edge device 24, a channel candidate number 113 for identifying each of a plurality of corresponding channels by a combination of the source edge address 111 and the destination edge address 112, tunneling addresses 114-1, ..., 114-N in the form of a list of node addresses of the node devices on each channel corresponding to the combination of the source edge address 111 and the destination edge address 112, which forms a list on the whole.

The "default" in the channel candidate number 113 is of the respective default of the routing information belonging to the respective node devices. The channel information on the other channel candidate, however, is in the form of a list, such as the node address of a first node device, the node address of a second node device, ..., and the node address of the last node device on a transfer channel, in order to transfer a user packet to any channel according to the loose source routing. This tunneling address should not necessarily be a node address list of the all node devices on a transfer channel but it may be a node address list of a necessary part of the node devices.

Upon receipt of the occurrence of congestion caused by the inside blocking from the source edge device 23, the channel judging unit 105 retrieves a combination of the source edge address and the destination edge address as a retrieval key from the channel database 106. Through this retrieval, a channel possible to avoid a node device having the notified occurrence of the congestion by the inside blocking is selected and notified to the source edge device 23 through the edge device interface 104.

When this change of a channel cannot avoid the congestion, the ATM control interface 107 is to issue a change request of the network resources (for example, VP link speed) to a control system not illustrated within the ATM network because it is necessary to change the network resources which have been assigned to the connectionless data transfer within the ATM network 20.

This time, the loose source routing by use of the tunneling addresses 114-1, 114-2, ..., 114-N of the transfer channel information will be described. The execution of the loose source routing, in the tunneling control unit 62 of the source edge device 23, makes flexible the change of a transfer channel within the ATM network 20, based on the node address list of transfer channels as mentioned above, without changing the transfer channel information having been established on the respective node devices 25-1, ..., 25-N. The source routing is to add the node addresses of all node devices on a channel to the respective transfer packets, while the loose source routing is only to add the node addresses of a necessary part of the node devices to the respective transfer packets.

In the loose source routing, a node address list of necessary node devices and a pointer indicating the progress of the transfer in the node address list are attached to the respective transfer packets. The node device takes out the node address indicated by the pointer from the node address list in the respective packet transfer and decides a transfer channel in reference to the routing table based on the node address. At this time, when the node address of the node device of own self is in accordance with the node address to be referred to, the pointer is advanced by one, and the next node address is taken out to decide a transfer channel from the routing table based on the node address in the same way.

According to the above-mentioned loose source routing, the respective node devices are provided with the routing tables 89 for use in the ordinal packet transfer, and the information on the loose source routing is attached to the respective transfer packets in the source edge device 23, thereby making the change of any transfer channel of the transfer packet easy and flexible, without changing the information of the routing table 89 belonging to a node device.

When the network device 26 receives a notice of the occurrence of congestion caused by the inside blocking detected by the source edge device 23, through the edge device interface 104, the channel judging unit 105 retrieves a transfer channel possible to avoid the node device where the congestion caused by the inside blocking occurred, from the channel database 106. The retrieval result is notified to the tunneling control unit 62 of the source edge device 23 as the node address list for use in the loose source routing as mentioned above.

At the occurrence of the congestion by the inside blocking, the tunneling control unit 62 of the source edge device 23 attaches the notified node address list to each transfer packet to send it to the ATM network, thereby changing the transfer channel to that one possible to avoid a congested node device by the inside blocking according to the loose source routing.

The technique on the loose source routing has been known to the public. Additionally, the other conventional loose source routing by the IP packet base has been known to the public.

Figure 12:
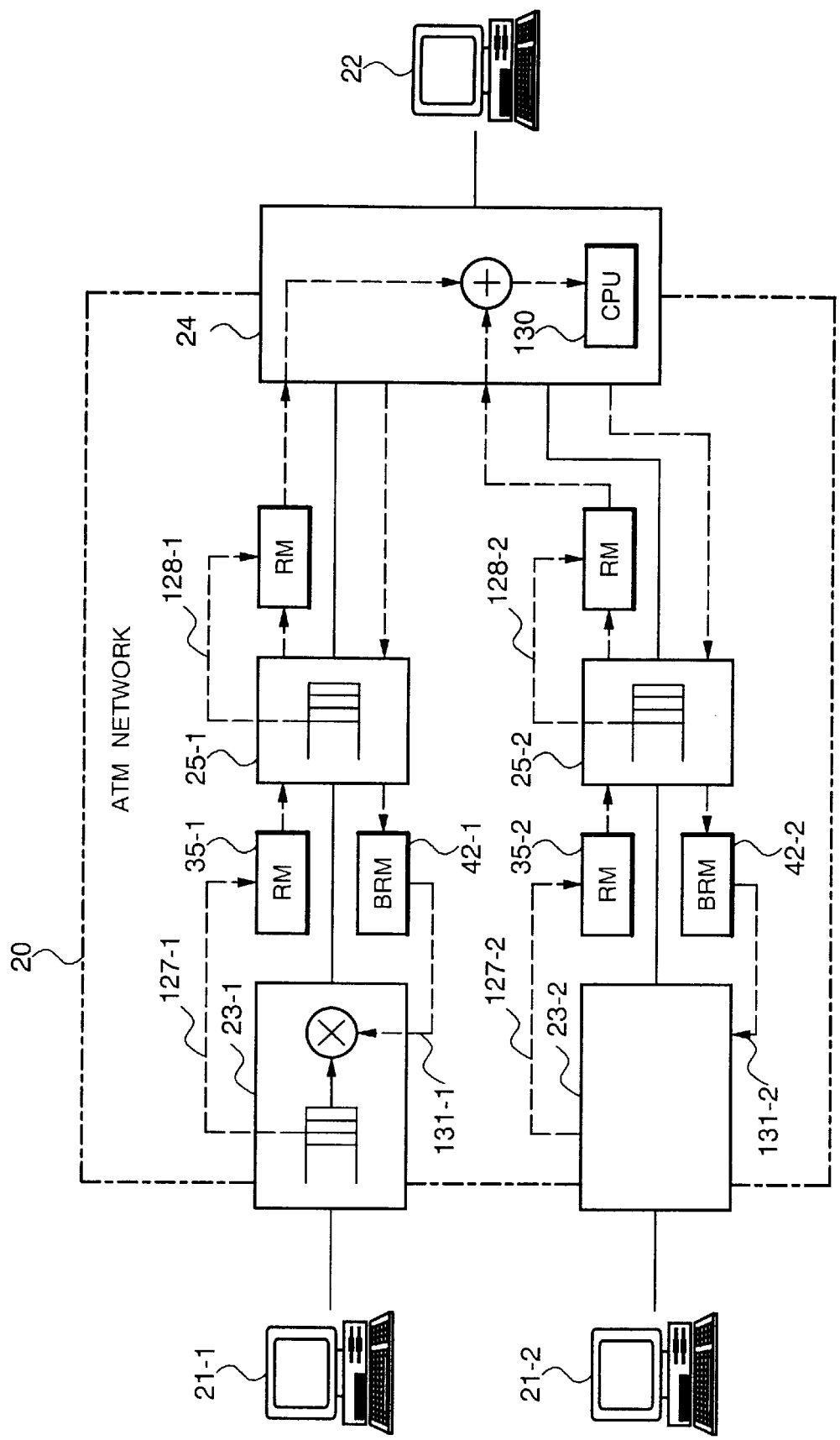
FIG. 12 is a view for use in describing the principle of detecting and avoiding congestion by use of an RM packet and a BRM packet according to the embodiment.

The operation of the congestion control system in the embodiment will be described this time. FIG. 12 is a view for use in describing the operational principle of the congestion control system for detecting and relieving the congestion by use of the RM packet 35 and the BRM packet 42 as mentioned above.

The congestion control system comprises an ATM network 20, a first source user LAN 21-1, a second source user LAN 21-2, and a destination user LAN 22. A source edge device 23-1 is provided on the boundary of the ATM network 20 and the first source user LAN 21-1, a source edge device 23-2 is provided on the boundaries of the ATM network 20 and the second source user LAN 21-2, and a destination edge device 24 is provided on the boundaries of the ATM network 20 and the destination user LAN 22. The source edge devices 23-1 and 23-2 and the destination edge device 24 within the ATM network 20 are interconnected through node devices 25-1 and 25-2 as a relay node.

The source edge devices 23-1 and 23-2 are constituted as illustrated in FIG. 6. The destination edge device 24 is constituted as illustrated in FIG. 7. The node devices 25-1 and 25-2 are constituted as illustrated in FIG. 8.

Assume that user packets are transferred respectively from the source user LAN 21-1 and 21-2 to the destination user LAN 22 via the ATM network 20 and that initially there is no congestion by the inside blocking in the source edge devices 23-1 and 23-2.

When sending a user packet from the source user LANs 21-1 and 21-2, the IP (Internet Protocol B) address is attached to the header portion of the packet. The source edge devices 23-1 and 23-2 accommodating the source user LANs 21-1 and 21-2 hold the user packets sent from the source user LANs 21-1 and 21-2 in a mid-frame and the destination edge address assigned to the destination edge device 24 that is the transfer destination and the source edge addresses respectively assigned to the source edge devices 23-1 and 23-2 are written into the header position defined in the mid-frame.

Figure 13:
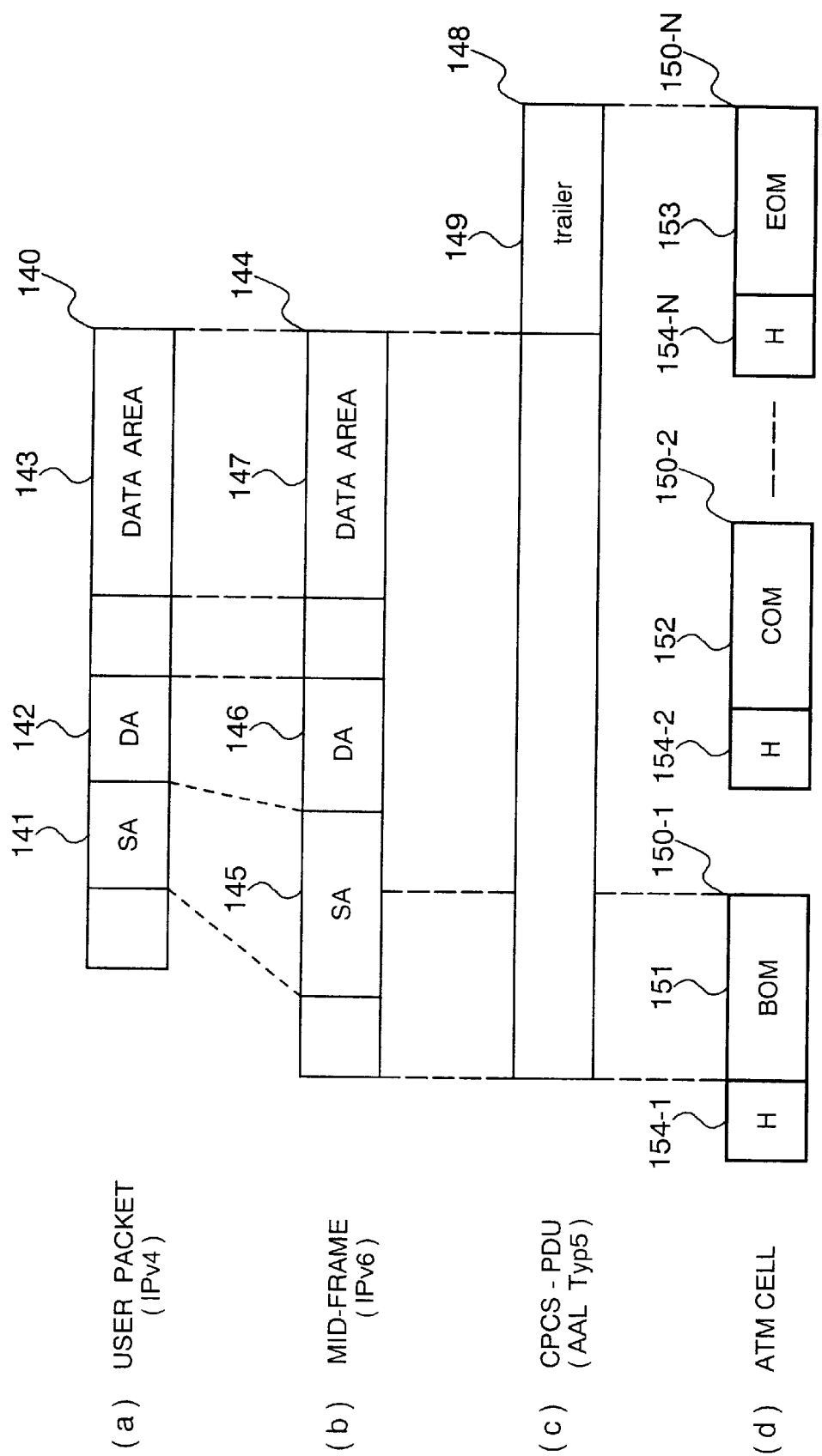
FIG. 13 is a view for use in describing a format structure of a user packet according to the embodiment.
Figure 14:
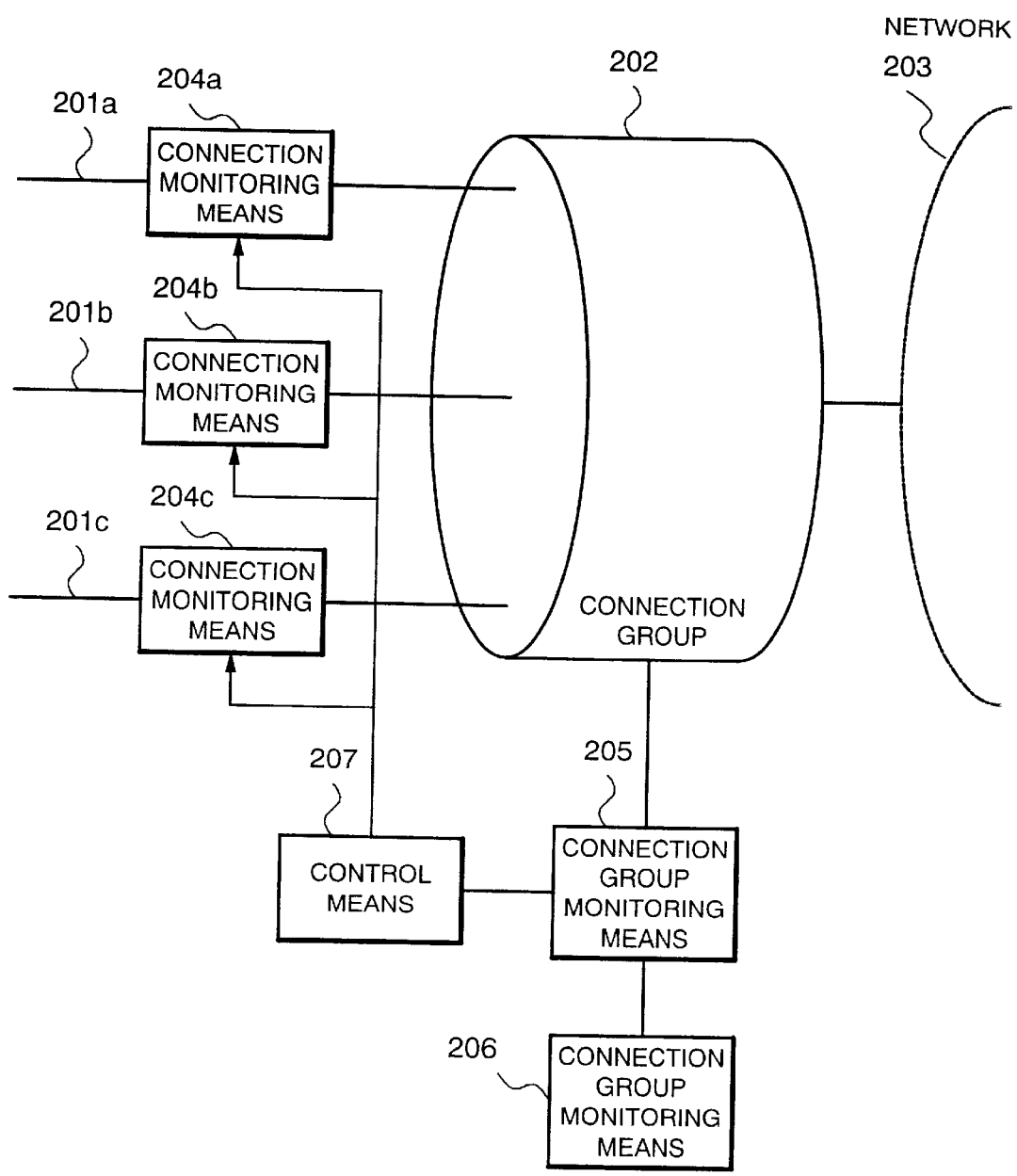
FIG. 14 is a structural view for use in describing the principle of the conventional congestion control system.

FIG. 13 shows the format structure in the respective steps of the conversion from a user packet sent from a user LAN, into an ATM cell. The user packet 140 shown in FIG. 13(a) includes a source address (SA) 141 and a destination address (DA) 142 of the IPv4 (Internet Protocol Version 4), and a data area 143.

The user packet (IPv4) 140 sent from a source user LAN is accommodated in the mid-frame 144 shown in FIG. 13(b) in the source edge device, when the source edge address 145 and the destination edge address 146 corresponding to the source IP address 141 and the destination IP address 142 included in the user packet are defined in the header portion of the mid-frame. The data area 143 of the user packet (IPv4) 140 becomes the data area 147 of the mid-frame (IPv6) 144 as it is. The mid-frame (IPv6), being added by a trailer 149, is converted into the structure of CPCS-PDU (Common Part Convergence Sublayer-Protocol Data Unit) 148 in the type 5 of the ATM adaptation layer (ATM Adaptation Layer: AAL) shown in FIG. 13(c). The data of the CPCS-PDU structure is broken down into cells 150-1, 150-2, 150-N, of a fixed length as shown in FIG. 13(d), and headers 154-1. 154-2, . . . , 154-N are respectively added to BOM 151, COM (Continuation Of Message) 152, and EOM (End Of Message) 153, thereby transmitting the data to the ATM network 20.

The description will be returned to FIG. 12. Hereinafter, the above-mentioned mid-frame is called as a packet, to distinguish it from a user packet on a user LAN.

The data is converted into a packet of the above-mentioned mid-frame in the source edge devices 23-1 and 23-2 holding user packets to be transferred from the source user LANs 21-1 and 21-2 to the destination user LAN 22, thereafter entering into the ATM network 20. At this time, since there is no congestion by the inside blocking, a packet passes through the tunneling control unit 62 of the source edge device without any processing. Thereafter, the packet passes through a packet transfer channel decided by each routing table 89 of each node device 25-1, 25-2, shown in FIG. 9 according to the destination edge address and after arriving at the destination edge device 24, it is converted into a user packet, so to be delivered to the destination user LAN 22.

In the respective source edge devices 23-1 and 23-2, the RM packet inserting units 63 periodically transfer the respective RM packets 35-1 and 35-2 to the destination edge device 24 that is the destination of this packet. The respective average flowing speeds 127-1 and 127-2 measured in every destination edge device of a packet by the corresponding average flowing speed control units 61 of the respective source edge devices are written in the respective RM packets 35-1 and 35-2 by the respective RM packet inserting units 63. The average flowing speed of a packet flowing into the ATM network 20, which is measured by the average flowing speed control unit 61, is used to detect congestion caused by the outside blocking and the inside blocking as mentioned above.

The respective node devices 25-1 and 25-2 decide the next node device or the edge device and transfer the packet, based on the destination edge address attached to the transferred packet. The congestion detecting units 88 of the node devices 25-1 and 25-2 shown in FIG. 8 monitor congestion within the own node devices, and the RM packet rewriting units of the interfaces to be affected by the congestion write the congestion information 128-1 and 128-2 including the node address of the node device of own self, the congestion level, and the presence of the congestion occurrence, into the congestion information fields 41 of the passing RM packets 35.

If detecting congestion within the node device 25-1, for example, the RM packet rewriting unit 91-1 of the interface 90-1 to be affected by the congestion is notified of the congestion information 128-1 including the node address of the node device 25-1, the congestion level of the detected congestion, and the congestion occurrence within the node device 25-1, so as to write the same into the congestion information field 41 of the passing RM packet 35.

In the packet arriving at the destination edge device 24 in this way, the RM packet 35 is detected by the average flowing speed monitoring unit 76 of the destination edge device 24 and the packet other than the RM packet is sent to the destination user LAN 22 as it is. The RM packet 35 detected by the average flowing speed monitoring unit 76 is sent to the BRM packet inserting unit 78 of the destination edge device 24, and returned to the source edge devices 23-1 and 23-2 as the respective BRM packets 42-1 and 42-2. The average flowing speed monitoring unit 76 notifies the permissible flowing speed judging unit 77 of the average flowing speed of the traffic transferred from the respective source edge devices 23-1 and 23-2 in reference to the field 40 of the RM packet 35.

The destination edge device 24 consists of a central processing unit (CPU) 130, and the permissible flowing speed judging unit 77 gets the total sum of the traffic flowing into the destination edge device 24 from the notified average flowing speed of the respective source edge devices. The permissible flowing speed judging unit 77 judges that the congestion caused by the outside blocking occurred when the total sum is greater than the predetermined VOUT as the link speed to send the packet to the destination user LAN 22.

Since the link speed VOUT transferable to the destination user LAN 22 cannot be increased during the operation of a network, it is necessary to decrease the total sum of the traffic flowing from the ATM network 20 into the destination edge device 24, in order to avoid the congestion caused by the outside blocking. Then, when it is judged that the congestion caused by the outside blocking occurred, the permissible flowing speed judging unit 77 of the destination edge device 24 decides the permissible average flowing speed as mentioned above, which is notified to the BRM packet inserting unit 78 together with the presence of the occurrence of the outside blocking. As mentioned above, the permissible average flowing speed decided here can be decided by "permissible average flowing speed=VOUT/M", for example, in case of assigning the identical permissible average flowing speed to the number M of source edge devices.

The BRM packet inserting unit 78 of the destination edge device 24 returns the RM packet 35 received from the average flowing speed monitoring unit 76, to the source edge device 23, after converting it into the BRM packet 42, when the presence of the occurrence of the outside blocking and the permissible flowing speed notified by the permissible flowing speed judging unit 77 are written into the permissible flowing speed field 48 of the BRM packet 42.

The BRM packets 42-1 and 42-2 conversely returned on the same channel of the RM packet in this way are entered into the BRM packet detecting units 71 of the source edge devices 23-1 and 23-2, and the presence of the occurrence of the outside blocking and the permissible flowing speeds (131-1, 131-2) written in the permissible flowing speed fields 48 of the BRM packets are notified to the respective congestion monitoring units 65.

The congestion monitoring unit 65 notifies the average flowing speed control unit 61 of the permissible average flowing speed notified by the BRM packet detecting unit 64 if receiving a notice of the occurrence of the outside blocking, and the average flowing speed control unit 61, upon receipt of the notice, controls so that the average flowing speed of the traffic toward the destination edge device 24 should not exceed the notified permissible average flowing speed (it should be the notified permissible average flowing speed or below).

The total sum of the traffic flowing into the destination edge device 24 will not be more than the link speed VOUT transferable from the destination edge device 24 to the destination user LAN 22, by the feedback control of the average flowing speed of the traffic flowing into the respective source edge devices 23-1 and 23-2, thereby autonomously relieving the congestion caused by the outside blocking.

The congestion monitoring unit 65 of each source edge device 23-1, 23-2 having the BRM packet 42 returned judges that the congestion caused by the inside blocking occurred, when there is no notice of congestion occurrence by the outside blocking and there is a notice of congestion occurrence within a node device on a transfer channel, in the congestion information field 49 shown in FIG. 5, by reference to the average flowing speed field 48 of the BRM packet 42 shown in FIG. 5.

The congestion caused by the inside blocking cannot be relieved even if decreasing the traffic between each source edge device 23-1, 23-2 and the destination edge device 24, as described so far. Since there is a case where congestion may occur on a channel of the ATM network 20 from each source edge device 23-1, 23-2 to the destination edge device 24, it is necessary to increase the network resources such as the link speed assigned on the channel, or change the resources on the whole network such as the channel change. Then, the network monitor 26 shown in FIG. 1 monitors and controls the whole ATM network 20. The BRM packet 42-1 returned to the source edge device 23-1 is detected by the BRM packet detecting unit 64 of the source edge device 23-1, and the source edge address, the destination edge address, and the congestion information 49 on the occurrence of the inside blocking written in the BRM packet are notified to the network monitor 26 by the congestion monitoring unit 65 of the source edge device 23-1.

The network monitor 26 notified of the inside blocking occurrence has the structure as shown in FIG. 10 and the congestion information is notified to the respective source edge devices through the edge device interface 104. The channel judging unit 105 of the network monitor 26 retrieves a pair of a source edge address and a destination edge address as a retrieval key in the congestion information on the notified inside blocking from the channel database 106, and a channel possible to avoid the channel having the notified congestion is selected from the information on a plurality of channels and notified only to the source edge device.

As mentioned above, the congestion control system is capable of changing a transfer channel flexibly, if a node address list of node devices is notified only to a source edge device, according to the loose source routing, without changing the routing list belonging to a node device. Thereafter, a packet from the source edge address to the destination edge address will be transferred on the changed new channel.

The source edge device 23 receiving a notice of the node address list of node devices from the network monitor 26 attaches the notified node address list to a packet for the destination edge address congested by the inside blocking and transfers it to the ATM network 20, in the tunneling control unit 62 through the congestion control unit 65 shown in FIG. 6.

However, when the congestion cannot be relieved even if changing the channel to a channel retrieved from the channel database 106, it is necessary to change the resources of the ATM network assigned for the connectionless data transfer within the ATM network 20. The network monitor requests another control system of the ATM network not illustrated to change the network resources (for example, VP link speed) through the ATM control interface 107.

The source edge device 23 can recognize the detection result of the congestion occurrence by the outside blocking detected by the destination edge device 24 and the congestion having occurred within a node device on a transfer channel, by use of the BRM packet 42, which makes it possible to judge the congestion occurrence by the inside blocking. The congestion occurrence by the inside blocking and the congestion information is notified to the network monitor 26 monitoring the whole network, so as to retrieve a candidate channel possible to avoid the congested channel caused by the inside blocking, and the transfer channel is changed according to the loose source routing in the source edge device 23, thereby making it possible to relieve the congestion caused by the inside blocking.

When the congestion caused by the inside blocking cannot be relieved by the channel change, the network monitor further requests another control system of the network to change the configuration of the network, thereby dynamically avoiding the congestion caused by the inside blocking and relieving the congestion.

Although the embodiment defines a predetermined packet as an RM packet and a BRM packet in order to detect and avoid the congestion, a cell can be defined as an RM cell and a BRM cell. Further, although a source edge device and a destination edge device are separately described in the function, in the embodiment, the both devices can be integrated into the identical edge device.

As set forth hereinabove, the congestion control system according to the present invention is designed to measure the average flowing speed flowing from a source user network with respect to a packet to be transferred from the source user network to a destination user network. Then, the total sum of the average flowing speed for every sending source is required and when the total sum is larger than the transfer speed toward the destination user network, it is designed to detect the congestion caused by the outside blocking as the first congestion. Upon detection of the first congestion, by notifying the total sum of the average flowing speed for every sending source and the permissible flowing speed calculated by the transfer speed toward the destination user network, it is designed to control the speed of the transfer packet flowing from the source user network so as not to exceed the notified permissible flowing speed. Thus, the present invention is capable of detecting the congestion caused by the outside blocking occurring on the boundaries of a user network and the ATM network for transferring connectionless data, with an easy operation.

The congestion control system according to the present invention is capable of not only detecting the congestion caused by the outside blocking, but also autonomously avoiding the congestion caused by the outside blocking, in a simple structure, since it is designed to control the flowing speed of a packet from a user network to the ATM network by calculating the permissible flowing speed.

The average flowing speed flowing from a source user network is measured, with respect to a transfer packet from the source user network to a destination user network in asynchronous transfer mode, and the total sum of the average flowing speed for every source is compared with the transfer speed to the destination user network, thereby detecting the congestion caused by the outside blocking as the first congestion. The permissible flowing speed is required from the total sum of the average flowing speed and the transfer speed toward the destination user network, and when detecting the first congestion, it is designed to control the average flowing speed of a packet flowing from the source user network so as not to exceed the permissible flowing speed.

It is designed to detect inside node congestion occurring on a relay node relaying the transfer packet between a source user network and a destination user network and when the inside node congestion is detected without occurrence of the first congestion, detect the congestion occurrence caused by the inside blocking as the second congestion. Upon detection of the second congestion, it is designed to change the channel to a new transfer channel so as to avoid the relay node having detection of the inside node congestion on the transfer channel of a packet, where the second congestion occurred, according to the transfer channel database. Thus, the congestion caused by the outside blocking occurring on the boundaries of a user network and the ATM network for transferring connectionless data can be detected and the flowing speed of a packet from the user network to the ATM network can be controlled according to the calculated permissible flowing speed, thereby making it possible not only to detect the congestion caused by the outside blocking with a simple operation, but also to avoid the congestion caused by the outside blocking autonomously. Further, it is possible to detect the inside node congestion occurring within a relay node of the ATM network, and detect the congestion caused by the inside blocking as the second congestion in case of detecting none of the first congestion. On detection of the congestion caused by the inside blocking, a transfer channel possible to avoid a relay node having the inside node congestion occurrence is retrieved from the information on a plurality of transfer channels stored in the transfer channel database, so as to change the transfer channel, thereby making it possible not only to detect the congestion caused by the inside blocking, but also to avoid the congestion caused by the inside blocking autonomously.

Further, it is designed to notify the measurement result of the average flowing speed for detecting the first congestion and the detection result of the first congestion by use of the RM packet and the BRM packet that are respectively the first and second congestion control packets. Therefore, since the congestion control packet can be transferred mixed with a user packet, it is possible to realize a congestion control system capable of autonomously avoiding the congestion caused by the outside blocking, in a simple structure free from complicated and enormous network equipment.

The measurement result of the average flowing speed for detecting the first congestion, the detection result of the first congestion, and the detection result of the inside node congestion detecting means are notified by use of the first and second congestion control packets. Therefore, since the congestion control packet can be transferred mixed with a user packet, it is possible to realize a congestion control system capable of autonomously avoiding the congestion caused by the outside blocking, in a simple structure free from complicated and enormous network equipment.

Since there is some cases in which the second congestion fails to be relieved only by the change of a transfer channel, assignment of the resources is required to a resource changing means for monitoring the whole network and assigning the network resources, thereby autonomously relieving the congestion caused by the inside blocking as the second congestion, which cannot be relieved only by the change of a transfer channel.

Since the average flowing speed flowing from every source user network can be controlled with the identical permissible flowing speed, the permissible flowing speed can be required in a simple operation, thereby reducing the load in calculation processing.

Since the transfer channel for avoiding the congestion caused by the inside blocking is changed by use of the loose source routing, it is possible to change a channel easily and flexibly, without changing the setting of a relay node within the ATM network. Further, the structure of a relay node can be simplified.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A congestion control system for detecting and relieving congestion occurring in a network system including an asynchronous transfer mode (ATM) network, a source user network for sending a transfer packet in asynchronous transfer mode, and a destination user network for receiving the transfer packet from the source user network, the congestion control system comprising:

average flowing speed measuring means for measuring average flowing speed of a transfer packet flowing from the source user network, for every destination user network;

first congestion detecting means for detecting first congestion occurring when the total sum of the average flowing speed of every source user network is greater than the transfer speed toward the destination user network;

permissible flowing speed calculating means for calculating permissible flowing speed of a transfer packet flowing from the source user network, based on the total sum of the average flowing speed and the transfer speed and establishing the permissible flowing speed; and flowing speed control means for controlling the average flowing speed of a packet flowing from the source user network under the permissible flowing speed when detecting first congestion by said first congestion detecting means, wherein said average flowing speed measuring means and said flowing speed control means are mounted on a source edge device provided in every source user network, on the boundaries of the ATM network and the source user network, and said permissible flowing speed calculating means and said first congestion detecting means are mounted on a destination edge device provided in every destination user network, on the boundaries of the ATM network and the destination user network.

2. A congestion control system for detecting and relieving congestion occurring in a network system including an asynchronous transfer mode (ATM) network, a source user network for sending a transfer packet in asynchronous transfer mode, and a destination user network for receiving the transfer packet from the source user network the congestion control system comprising:

average flowing speed measuring means for measuring average flowing speed of a transfer packet flowing from the source user network, for every destination user network;

first congestion detecting means for detecting first congestion occurring when the total sum of the average flowing speed of every source user network is greater than the transfer speed toward the destination user network;

permissible flowing speed calculating means for calculating permissible flowing speed of a transfer packet flowing from the source user network, based on the total sum of the average flowing speed and the transfer speed and establishing the permissible flowing speed; and flowing speed control means for controlling the average flowing speed of a packet flowing from the source user network under the permissible flowing speed when detecting first congestion by said first congestion detecting means, wherein said average flowing speed measuring means and said flowing speed control means are mounted on a source edge device provided in every source user network, on the boundaries of the ATM network and the source user network, said permissible flowing speed calculating means and said first congestion detecting means are mounted on a destination edge device provided in every destination user network, on the boundaries of the ATM network and the destination user network, said source edge device writes the measured average flowing speed into the first congestion controlling packet for controlling congestion and notifies the packet to said destination edge device, and said destination edge device writes the first congestion detected by said first congestion detecting means into the second congestion controlling packet to be returned in reply to the first congestion controlling packet and notifies the packet to said source edge device.

3. A congestion control system for detecting and relieving congestion occurring in a network system including an asynchronous transfer mode (ATM) network, a source user network for sending a transfer packet in asynchronous transfer mode, a destination user network for receiving the transfer packet from the source user network, and relay nodes relaying a transfer packet to be transferred between the source user network and the destination user network, the congestion control system comprising:

average flowing speed measuring means for measuring average flowing speed of a transfer packet flowing from the source user network, for every destination user network;

first congestion detecting means for detecting first congestion occurring when the total sum of the average flowing speed of every source is greater than the transfer speed toward the destination user network;

permissible flowing speed calculating means for calculating permissible flowing speed of a transfer packet flowing from the source user network, based on the total sum of the average flowing speed and the transfer speed;

flowing speed control means for controlling the average flowing speed of a packet flowing from the source user network under the permissible flowing speed when detecting first congestion by said first congestion detecting means;

inside node congestion detecting means for detecting inside node congestion occurring when the transfer speed of a packet received at the receiving side of the relay node is greater than the transfer speed at the sending side of the relay node;

second congestion detecting means for detecting second congestion occurring when said inside node congestion detecting means detects the inside node congestion and said first congestion detecting means detects none of the first congestion;

transfer channel database for storing transfer channel information indicating transfer channels corresponding to the transfer from said source user network to said destination user network;

transfer channel retrieving means for retrieving a transfer channel possible to avoid a relay node having the inside node congestion detected by said inside node congestion detecting means, from said transfer channel database, when detecting the second congestion by said second congestion detecting means; and transfer channel control means for controlling the transfer based on a transfer channel retrieved by said transfer channel retrieving means, wherein said average flowing speed measuring means, said flowing speed control means, said second congestion detecting means, and said transfer channel control means are mounted on a source edge device provided in every source user network, on the boundaries of the ATM network and the source user network, said permissible flowing speed calculating means and said first congestion detecting means are mounted on a destination edge device provided in every destination user network, on the boundaries of the ATM network and the destination user network, and said transfer channel database and said transfer channel retrieving means are provided in a network monitor for monitoring the congestion state within the ATM network.

4. A congestion control system for detecting and relieving congestion occurring in a network system including an asynchronous transfer mode (ATM) network, a source user network for sending a transfer packet in asynchronous transfer mode, a destination user network for receiving the transfer packet from the source user network, and relay nodes relaying a transfer packet to be transferred between the source user network and the destination user network, the congestion control system comprising:

average flowing speed measuring means for measuring average flowing speed of a transfer packet flowing from the source user network, for every destination user network;

first congestion detecting means for detecting first congestion occurring when the total sum of the average flowing speed of every source is greater than the transfer speed toward the destination user network;

permissible flowing speed calculating means for calculating permissible flowing speed of a transfer packet flowing from the source user network, based on the total sum of the average flowing speed and the transfer speed;

flowing speed control means for controlling the average flowing speed of a packet flowing from the source user network under the permissible flowing speed when detecting first congestion by said first congestion detecting means;

inside node congestion detecting means for detecting inside node congestion occurring when the transfer speed of a packet received at the receiving side of the relay node is greater than the transfer speed at the sending side of the relay node;

second congestion detecting means for detecting second congestion occurring when said inside node congestion detecting means detects the inside node congestion and said first congestion detecting means detects none of the first congestion;

transfer channel database for storing transfer channel information indicating transfer channels corresponding to the transfer from said source user network to said destination user network;

transfer channel retrieving means for retrieving a transfer channel possible to avoid a relay node having the inside node congestion detected by said inside node congestion detecting means, from said transfer channel database, when detecting the second congestion by said second congestion detecting means; and transfer channel control means for controlling the transfer based on a transfer channel retrieved by said transfer channel retrieving means, wherein said average flowing speed measuring means, said flowing speed control means, said second congestion detecting means, and said transfer channel control means are mounted on a source edge device provided in every source user network, on the boundaries of the ATM network and the source user network, said permissible flowing speed calculating means and said first congestion detecting means are mounted on a destination edge device provided in every destination user network, on the boundaries of the ATM network and the destination user network, said transfer channel database and said transfer channel retrieving means are provided in a network monitor for monitoring the congestion state within the ATM network, said source edge device includes notifying means for writing the measured average flowing speed into the first congestion controlling packet for controlling congestion and notifying the packet to said destination edge device via the relay node having said inside node congestion detecting means, and said destination edge device includes notifying means for writing the first congestion detected by said first congestion detecting means and the detection result by said inside node congestion detecting means into the second congestion controlling packet to be returned in reply to the first congestion controlling packet and notifying the packet to said source edge device and the network monitor.

5. A congestion control system for detecting and relieving congestion occurring in a network system including an asynchronous transfer mode (ATM) network, a source user network for sending a transfer packet in asynchronous transfer mode, a destination user network for receiving the transfer packet from the source user network, and relay nodes relaying a transfer packet to be transferred between the source user network and the destination user network, the congestion control system comprising:

average flowing speed measuring means for measuring average flowing speed of a transfer packet flowing from the source user network, for every destination user network;

first congestion detecting means for detecting first congestion occurring when the total sum of the average flowing speed of every source is greater than a transfer speed toward the destination user network;

permissible flowing speed calculating means for calculating permissible flowing speed of a transfer packet flowing from the source user network, based on the total sum of the average flowing speed and the transfer speed;

flowing speed control means for controlling the average flowing speed of a packet flowing from the source user network under the permissible flowing speed when detecting first congestion by said first congestion detecting means;

inside node congestion detecting means for detecting inside node congestion occurring when a transfer speed of a packet received at the receiving side of the relay node is greater than the transfer speed at the sending side of the relay node;

second congestion detecting means for detecting second congestion occurring when said inside node congestion detecting means detects the inside node congestion and said first congestion detecting means detects non of the first congestion;

transfer channel database for storing transfer channel information indicating transfer channels corresponding to the transfer from said source user network to said destination user network;

transfer channel retrieving means for retrieving a transfer channel possible to avoid a relay node having the inside node congestion detected by said inside node congestion detecting means, from said transfer channel database, when detecting the second congestion by said second congestion detecting means; and transfer channel control means for controlling the transfer based on a transfer channel retrieved by said transfer channel retrieving means, said transfer channel control means changes a transfer channel according to loose source routing comprising attaching to a transfer packet an address list of node devices necessary for the transfer and a pointer indicating the progress of the transfer in the node address list so as to control the transfer.

\* \* \* \* \*